United States Patent
Mannari et al.

(10) Patent No.: US 11,414,524 B2
(45) Date of Patent: Aug. 16, 2022

(54) ORGANIC-INORGANIC POLYMERIC COMPOSITIONS, RELATED ARTICLES, AND RELATED METHODS

(71) Applicant: EASTERN MICHIGAN UNIVERSITY, Ypsilanti, MI (US)

(72) Inventors: Vijaykumar M. Mannari, Saline, MI (US); Himanshu Manchanda, Nashville, TN (US); Hamidreza Asemani, Kenosha, WI (US)

(73) Assignee: EASTERN MICHIGAN UNIVERSITY, Ypsilanti, MI (US)

( * ) Notice: Subject to any disclaimer, the term of this patent is extended or adjusted under 35 U.S.C. 154(b) by 0 days.

(21) Appl. No.: 17/082,390

(22) Filed: Oct. 28, 2020

(65) Prior Publication Data

US 2021/0122884 A1 Apr. 29, 2021

Related U.S. Application Data

(60) Provisional application No. 62/926,733, filed on Oct. 28, 2019.

(51) Int. Cl.
| | | |
|---|---|---|
| *C08F 2/46* | (2006.01) | |
| *C08F 2/50* | (2006.01) | |
| *C08G 61/04* | (2006.01) | |
| *C08G 83/00* | (2006.01) | |
| *C08K 5/06* | (2006.01) | |
| *C08K 5/3465* | (2006.01) | |
| *C08K 5/17* | (2006.01) | |
| *C08F 222/10* | (2006.01) | |
| *C08G 18/10* | (2006.01) | |
| *C08G 18/72* | (2006.01) | |
| *C08K 5/00* | (2006.01) | |
| *B33Y 10/00* | (2015.01) | |
| *B33Y 70/00* | (2020.01) | |
| *B33Y 80/00* | (2015.01) | |
| *C08L 33/14* | (2006.01) | |
| *C08L 67/07* | (2006.01) | |
| *C08L 75/04* | (2006.01) | |

(52) U.S. Cl.
CPC ............ *C08G 83/001* (2013.01); *B33Y 10/00* (2014.12); *B33Y 70/00* (2014.12); *B33Y 80/00* (2014.12); *C08F 222/102* (2020.02); *C08F 222/103* (2020.02); *C08G 18/10* (2013.01); *C08G 18/72* (2013.01); *C08K 5/0025* (2013.01); *C08K 5/06* (2013.01); *C08K 5/17* (2013.01); *C08K 5/3465* (2013.01); *C08L 33/14* (2013.01); *C08L 67/07* (2013.01); *C08L 75/04* (2013.01); *C08L 2312/06* (2013.01)

(58) Field of Classification Search
CPC .......... C09D 4/00; B33Y 10/00; B33Y 70/00; B33Y 80/00; C08F 222/103; C08F 222/102; C08F 222/1065; C08K 5/06; C08K 5/0025; C08K 5/17; C08K 5/3465; C08G 18/73; C08G 18/72; C08G 18/672; C08G 18/10; C08G 18/792; C08L 75/04; C08L 75/16; C08L 33/14; C08L 67/07; C08L 2312/06
USPC ............. 522/26, 7, 6, 189, 184, 71, 1; 520/1
See application file for complete search history.

(56) References Cited

U.S. PATENT DOCUMENTS

2012/0258319 A1 10/2012 Mannari

FOREIGN PATENT DOCUMENTS

| WO | WO-2013192480 A2 * | 12/2013 | ............ C08G 75/045 |
| WO | WO-2016166382 A1 * | 10/2016 | ............. B05D 3/067 |

OTHER PUBLICATIONS

Asemani et al., "Dual-Curing Thermoset Materials Using a Novel UV Initiated Mechanism Suitable for 3D Printing Applications," Presented at RadTech 2020, Orlando, Florida, Mar. 8-11, 2020.
Asemani et al., "Corrosion-Resistant Organic-Inorganic Hybrid Pretreatments Obtained by UV-Initiated Process Suitable for Primer-Less Coating Systems", *Progress in Organic Coatings* 147 (2020) 105878.
Manchandra et al., "Super Photo-Base Initiated Organic-Inorganic Hybrid Coatings by Plural-Cure Mechanisms", *Progress in Organic Coatings* 127:222-230 (2019).
Mannari et al., "Organic-Inorganic Hybrid Coatings for High-Performance Protective Coating Applications," presented at RadTech 2020, Orlando, Florida, Mar. 8-11, 2020.

* cited by examiner

*Primary Examiner* — Jessica Whiteley
(74) *Attorney, Agent, or Firm* — Marshall, Gerstein & Borun LLP

(57) ABSTRACT

The disclosure relates to an organic-inorganic hybrid (OIH) polymeric composition and related methods for forming the same. The disclosure also relates to a polymeric composition as disclosed herein and related methods for forming the same. The OIH polymeric composition and the polymeric composition can be formed by UV-irradiating a corresponding composition including a Michael-addition (MA) acceptor compound, a Michael-addition (MA) donor compound, a silane compound, when present, and a photo-latent base initiator to form a corresponding base catalyst and catalyze the reactions forming the networked polymer. The OIH polymeric composition and the polymeric composition can be used as a coating on any of a variety of substrates or as an interlayer in an additive manufacturing process.

22 Claims, 6 Drawing Sheets

Aza-Michel Reaction

1.

2.

ORGANIC-INORGANIC POLYMERIC COMPOSITIONS, RELATED ARTICLES, AND RELATED METHODS

CROSS REFERENCE TO RELATED APPLICATION

This application claims the benefit under 35 U.S.C. § 119(e) of U.S. Provisional Patent Application No. 62/926,733, filed on Oct. 28, 2019, the entirety of which is hereby incorporated by reference.

STATEMENT OF GOVERNMENT INTEREST

None.

BACKGROUND OF THE DISCLOSURE

Field of the Disclosure

The disclosure relates to an organic-inorganic hybrid (OIH) polymeric composition and related methods for forming the same, for example for use as a substrate coating. The OIH polymeric composition is generally a networked or crosslinked polymer including a base-catalyzed reaction product between: (i) a Michael-addition (MA) acceptor compound, (ii) a Michael-addition (MA) donor compound, and (iii) a silane compound including a hydrolysable group and an MA acceptor or donor group. The OIH polymeric composition can be formed by UV-irradiating a corresponding composition including the MA acceptor compound, the MA donor compound, silane compound, and a photo-latent base initiator.

Background

Photo-cure technology has been used in coatings, inks, adhesives, and additive manufacturing (3D-printing) applications. Benefits of photo-curing compared to other technologies include rapid curing, VOC-free compositions, low energy consumption, and efficient processing. The most commonly used, and most commercialized technology within photo-curing relies on UV-induced free-radical polymerization chemistry. While this route has many technical benefits over other technologies such as water-borne coatings, high-solid coatings, it also has a number of inherent limitations such as: oxygen inhibition at the surface (resulting in poor cure at the surface), substantial volume shrinkage, poor adhesion, use of acrylate monomers as reactive diluents that have toxicity, among others. Other chemistries have been used to address the foregoing limitations or for other technical benefits. For example, cationic cure technology using super photo-acid generator has been used to reduce volume shrinkage or to eliminate oxygen inhibition, while photo-base initiated curing provides benefit of reduced oxygen inhibition.

There has been some considerable research in the field of organic-inorganic hybrid (OIH) coatings. Several chemistries have been used to develop OIH coatings using a variety of photo-initiators. The literature mentions the use of photo-acid and photo-base generators that are used as catalysts. Monomers such as (3-glycidyloxypropyl) trimethoxysilane (GMTMS), urethane methacrylate trimethoxysilane (UAMS) and 2-(3,4-epoxy-cyclohexylethyl) trimethoxysilane (TRIMO) and vinyltrimethoxysilane (VTMS) have been used to form OIH networks where the silane groups undergo sol-gel process to form the inorganic network and the other functional groups present in the monomer react to form the organic network. This way, the organic and the inorganic parts are connected by a covalent bond. A DBN (1,5-Diazabicyclo[4.3.0]non-5-ene)-based photo-base generator has been used to catalyze thiol-epoxide chemistry.

Aza-Michael addition (MA) between 3-(methacryloxy-propyl) trimethoxysilane (MAPTS) and diethanol amine (DEA) has been used to synthesize a compound, which was then used as a chain extender to form a hybrid waterborne polyurethane. Another case of aza-Michael addition between acrylates and amines was used to form a hybrid polymer graphene nano-composite where the polymer is formed by MA of acrylates and acetoacetates by UV curing in presence of DBN based photo-latent base. A novel photo-latent base (PLB) based on DBN has been utilized to catalyze MA between acetoacetates and acrylates after UV-curing as well as to catalyze polyurethane(PU) formation between polyols and isocyanates upon UV-curing. The PLB in its latent form could effectively stay in a formulation with isocyanates and polyols, increasing the pot-life of the formulation from a few hours to about 24 hours. MA between acrylates and acetoacetates in the presence of DBN has been followed by free-radical polymerization between the residual acrylates and methacrylate-based monomers. MA between multi-functional acrylates and multi-functional acetoacetates in the presence of a base has been used to form a crosslinked network. The acrylates, in the presence of a strong base, not only react via MA but also react with other acrylates via anionic polymerization. MA between acrylates and acetoacetates using a DBN-based PLB has been used in a system further including tetraethyl orthosilicate (TEOS).

Apart from MA, OIH networks have also been formed through other chemistries. A photo-latent DBN base has been used to catalyze thiol/epoxide reactions along with the formation of inorganic nanoparticles using sol-gel chemistry. A UV-curable hybrid coating has been formed using monomers such as TEOS, MPS, VTMS and acrylate polymerization through free-radical polymerization. OIH coatings have been formed using multi-functional VTMS oligomers and sol-gel chemistry in which the organic portion was formed using UV-curing of VTMS with an acrylated polyester. Epoxy-silica hybrid sol-gels have been cured thermally with amine compounds.

SUMMARY

In an aspect, the disclosure relates to a method for forming an organic-inorganic hybrid (OIH) polymeric composition, the method comprising: (a) providing a UV-curable composition comprising: (i) a Michael-addition (MA) acceptor compound comprising at least one MA acceptor functional group, (ii) a Michael-addition (MA) donor compound comprising at least one MA donor functional group, (iii) a silane compound comprising (A) at least one hydrolysable group and (B) at least one of an MA acceptor functional group and an MA donor functional group, (iv) a photo-latent base initiator, (v) optionally a polyisocyanate comprising at least two isocyanate groups, and (vi) optionally a polyol comprising at least two hydroxyl groups; and (b) exposing the UV-curable composition to UV radiation (i) to form a base catalyst from the photo-latent base initiator and (ii) to subsequently catalyze with the base catalyst (A) MA polymerization between MA acceptor functional groups and MA donor functional groups, (B) anionic polymerization between MA acceptor functional groups, and (C) condensation of silanol groups formed from hydrolysis of the hydrolysable groups, thereby forming a (cured/networked)

organic-inorganic hybrid (OIH) polymeric composition. MA polymerization between MA acceptor functional groups and MA donor functional groups can include chain propagation and/or crosslinking of organic polymer as well as organic-inorganic links. Likewise, anionic polymerization between MA acceptor functional groups can include chain propagation and/or crosslinking of organic polymer as well as organic-inorganic links. Condensation of silanol groups formed from hydrolysis of the hydrolysable groups can include chain propagation and/or crosslinking of a resulting inorganic network (e.g., Si—O—Si network)). The examples illustrated below generally use alkoxysilanes with an MA acceptor group (e.g., acrylate functional group as illustrated) as the silane compound, but the silane compound alternatively can include an MA donor group (e.g., acetoacetate functional group or otherwise) for incorporation into the organic network.

The OIH composition suitably can be formed with the MA acceptor, the MA donor, and the silane compound as the minimum components; the polyisocyanate and/or the polyol can be included in some embodiments, but are not required. When present, the polyisocyanate and the polyol react to form a polyurethane. The polyisocyanate and the polyol can react/cure independently and need not covalently react with the silane or the MA components/networks. Thus, the result can be an interpenetrating network between the silane/MA component network and the polyurethane. In some embodiments, however, the polyisocyanate and/or the polyol can include a hydrolysable silane group (e.g., alkoxy group) and/or an MA group (e.g., acetoacetate or other MA donor), thus allowing the polyisocyanate, polyol, and/or corresponding polyurethane chain to be covalently incorporated into the network with the silane and MA components.

The UV radiation generates the base catalyst in situ in the UV-curable composition, and then the base catalyst catalyzes the various polymerization reactions, independent of UV radiation. More specifically, there is no need to continuously apply UV radiation throughout the curing process; it need only be applied at the beginning to generate the base catalyst, but curing can proceed over a longer period in the absence of UV radiation, including the various MA polymerization, anionic polymerization, and silanol condensation reactions. In some embodiments, the base catalyst can also catalyze hydrolysis of the silane hydrolysable groups to silanol groups. Similarly in some embodiments, the base catalyst can also catalyze the polyisocyanate/polyol reaction for PU formation and/or some reaction of the polyisocyanate or polyol with other OIH network components, for example when the polyisocyanate and/or polyol include a silane group and/or an MA group.

Various refinements of the method for forming an OIH polymeric composition are possible.

In a refinement, the MA acceptor compound comprises two or more MA acceptor functional groups. Suitably, the MA acceptor compound includes multiple MA acceptor functional groups for organic polymer chain propagation and/or crosslinking. For example, the MA acceptor compound can have at least 2, 3, 4, 6, 8, or 10 and/or up to 3, 4, 6, 8, 10, 12, or 15 MA acceptor functional groups.

In a refinement, the MA acceptor functional groups are selected from the group consisting of acrylate groups, methacrylate groups, vinyl groups, and combinations thereof. More generally, alpha-, beta-unsaturated compounds (e.g., including acrylates, methacrylates) and ketones are suitable MA acceptors. In another refinement, the MA acceptor functional groups comprise blocked amine groups.

An example of a suitable acrylate MA acceptor functional group is $R_1R_2C=CR_3-C(=O)O-$. $R_1$, $R_2$, and $R_3$ can independently be selected from hydrogen (H), hydrocarbons containing from 1 to 20 carbon atoms, and heteroatom-substituted (e.g., N-, O-, P-, or S-substituted) hydrocarbons containing from 1 to 20 carbon atoms. The hydrocarbons and heteroatom-substituted hydrocarbons can be linear, branched, and/or cyclic, aliphatic and/or aromatic, saturated and/or unsaturated, etc., for example having at least 1, 2, 3, 4, 6, 8, or 10 and/or up to 2, 4, 6, 8, 10, 12, 15, or 20 carbon atoms. Selection of $R_1$, $R_2$, and $R_3$ as H corresponds to an acrylate/acrylic acid functional group. Selection of $R_1$ and $R_2$ as H and $R_3$ as $CH_3$ corresponds to an methacrylate/methacrylic acid functional group.

An example of a corresponding acrylate-based MA acceptor compound is $[R_1R_2C=CR_3-C(=O)O-]_m-H_a$. The index m can have a value or 1 (e.g., for a mono-functional acceptor) or 2 or more (e.g., for a poly-functional acceptor), for example being at least 2, 3, 4, 6, 8, or 10 and/or up to 3, 4, 6, 8, 10, 12, or 15. The $H_a$ group as an organic core or body portion of the eventual cured composition can include hydrocarbons containing from 1 to 50 carbon atoms, and heteroatom-substituted (e.g., N-, O-, P-, or S-substituted) hydrocarbons containing from 1 to 50 carbon atoms. The hydrocarbons and heteroatom-substituted hydrocarbons can be linear, branched, and/or cyclic, aliphatic and/or aromatic, saturated and/or unsaturated, etc., for example having at least 1, 2, 3, 4, 6, 8, 10, or 20 and/or up to 2, 4, 6, 8, 10, 15, 20, 30, 40, or 50 carbon atoms.

In a refinement, the MA acceptor compound is selected from the group consisting of trimethylolpropane triacrylate (TMPTA), 1,6-hexanediol diacrylate (HDDA), dipropylene glycol diacrylate (DPGDA), pentaerythritol triacrylate (PE-TIA), and combinations thereof. The MA acceptor compound additionally can include polymeric or oligomeric compounds with (meth)acrylate functional groups and combinations thereof, for example including polymers or oligomers of the foregoing monomers. More generally, the MA acceptor compound can be an ester reaction product between (for example) an acrylic acid compound (e.g., $R_1R_2C=CR_3-C(=O)OH$ with $R_1$, $R_2$, and $R_3$ as defined above) and a polyol Suitable polyols can include the same as those used in forming a polyurethane portion of the eventual cured composition. Similarly, the MA acceptor compound can be an urethane reaction product between (for example) a hydroxyalkyl-functionalized acrylic acid compound (e.g., $R_1R_2C=CR_3-C(=O)OR'$ with $R_1$, $R_2$, and $R_3$ as defined above and R' being a hydroxyalkyl group with 1 to 10 carbon atoms, for example 2-hydroxyethyl) and a polyisocyanate Suitable polyisocyanates can include the same as those used in forming a polyurethane portion of the eventual cured composition. Other MA acceptor compounds can include acrylate-functionalized compounds such as polyester acrylates, urethane acrylates, etc. In another refinement, the MA acceptor compound is a ketimine compound.

In a refinement, the MA donor compound comprises two or more MA donor functional groups. Suitably, the MA donor compound includes multiple MA donor functional groups for organic polymer chain propagation and/or crosslinking. For example, the MA donor compound can have at least 2, 3, 4, 6, 8, or 10 and/or up to 3, 4, 6, 8, 10, 12, or 15 MA donor functional groups.

In a refinement, the MA donor functional groups are selected from the group consisting of acetoacetate groups, thiol groups, and combinations thereof. More generally, nucleophiles, such as amines (e.g., aza-Michael addition, thiols (mercaptans), and acetoacetate-functional compounds are suitable MA donors.

An example of a suitable acetoacetate MA donor functional group is $R_4C(=O)—CR_5R_6—C(=O)O—$. $R_4$, $R_5$, and $R_6$ can independently be selected from hydrogen ($R_5$ and $R_6$ only), hydrocarbons containing from 1 to 20 carbon atoms, and heteroatom-substituted (e.g., N-, O-, P-, or S-substituted) hydrocarbons containing from 1 to 20 carbon atoms. The hydrocarbons and heteroatom-substituted hydrocarbons can be linear, branched, and/or cyclic, aliphatic and/or aromatic, saturated and/or unsaturated, etc., for example having at least 1, 2, 3, 4, 6, 8, or 10 and/or up to 2, 4, 6, 8, 10, 12, 15, or 20 carbon atoms. Selection of $R_4$ as $CH_3$ and $R_5$ and $R_6$ as H and corresponds to an unsubstituted acetoacetate functional group.

An example of a corresponding acetoacetate-based MA donor compound is $[R_4C(=O)—CR_5R_6—C(=O)O—]_n—H_d$. The index n can have a value or 1 (e.g., for a mono-functional donor) or 2 or more (e.g., for a poly-functional donor), for example being at least 2, 3, 4, 6, 8, or 10 and/or up to 3, 4, 6, 8, 10, 12, or 15. The $H_d$ group as an organic core or body portion of the eventual cured composition can include hydrocarbons containing from 1 to 50 carbon atoms, and heteroatom-substituted (e.g., N-, O-, P-, or S-substituted) hydrocarbons containing from 1 to 50 carbon atoms. The hydrocarbons and heteroatom-substituted hydrocarbons can be linear, branched, and/or cyclic, aliphatic and/or aromatic, saturated and/or unsaturated, etc., for example having at least 1, 2, 3, 4, 6, 8, 10, or 20 and/or up to 2, 4, 6, 8, 10, 15, 20, 30, 40, or 50 carbon atoms.

In a refinement, the MA donor compound is selected from the group consisting of trimethylolpropane triacetoacetate (TMP-AA), 1,6-hexanediol diacetoacetate (HD-AA), dipropylene glycol diacetoacetate (DPG-AA), pentaerythritol triacetoacetate (PET-AA), and combinations thereof. The MA donor compound additionally can include acetoacetate-functionalized forms of polymeric polyols, such as polyester polyols, polyether polyols, polyacrylate polyols. More generally, the MA donor compound can be an ester reaction product between (for example) an acetoacetate compound (e.g., $R_4C(=O)—CR_5R_6—C(=O)OH$ or $R_4C(=O)—CR_5R_6—C(=O)O-(t-C_4H_9)$ with $R_4$, $R_5$, and $R_6$ as defined above) and a polyol For example, t-butyl acetoacetate can be used to form transesterification products with polyols including a polyfunctional MA donor compound and t-butanol. Suitable polyols can include the same as those used in forming a polyurethane portion of the eventual cured composition.

In a refinement, the silane compound comprises two or more hydrolysable groups. Suitably, the silane compound includes multiple hydrolysable groups for inorganic network chain propagation and/or crosslinking. For example, a silane compound with a single silicon atom can have 2 or 3 hydrolysable groups. Similarly, a silane compound with a multiple silicon atoms can have an average of at least 1.5 or 2 and/or up to 3 or 3.5 hydrolysable groups per silicon atom. The form of the silane compound is not particularly limited, for example including any suitable organosilicon (e.g., containing Si—C bonds) and/or siloxane (e.g., containing Si—O bonds) structures with at least one of the silicon atoms having hydrolysable group(s) bound thereto. More generally, a silane compound with one or more silicon atoms can have at least 2, 3, 4, 6, 8, or 10 and/or up to 3, 4, 6, 8, 10, 12, or 15 hydrolysable groups total.

Similarly, the silane compound includes at least one MA acceptor/donor group for incorporation into the OIH network. For example, a silane compound with a single silicon atom can have 1 or 2 MA acceptor/donor groups (e.g., 1 donor, 1 acceptor, 2 donors, 2 acceptors, 1 donor and 1 acceptor). Similarly, a silane compound with a multiple silicon atoms can have an average of at least 0.5 or 1 and/or up to 1.5 or 2 MA acceptor/donor groups per silicon atom. Similar to above with a generic silane compound including any suitable organosilicon (Si—C) and/or siloxane (Si—O) structures, the MA acceptor/donor group(s) can be bound thereto at any suitable location, for example at a carbon atom of a carbon linking group between the MA acceptor/donor group(s) and a silicon atom. More generally, a silane compound with one or more silicon atoms can have at least 1, 2, 3, 4, or 6 and/or up to 2, 4, 6, or 10 MA acceptor/donor groups total.

In a refinement, the hydrolysable groups are selected from the group consisting of alkoxy groups, aryloxy groups, carboxyloxy groups, halogens, and combinations thereof. The hydrolysable (silyl) groups include functional groups attached to a silicon atom (e.g., 1, 2, or 3 functional hydrolysable groups per silicon atom) that can be hydrolyzed under suitable conditions (e.g., when in contact with water, such as when exposed to atmospheric moisture, under acidic conditions, etc.) to form corresponding silanol (Si—OH) functional groups, which in turn can be condensed to form siloxane (Si—O—Si) functional groups/linkages in a cured OIH composition/coating, thus forming the inorganic portion of the composition. The hydrolysable group can include a hydrocarbon group linked via an oxygen atom to a silicon atom (e.g., Si—OR, such as alkoxy groups having 1, 2, 3, or 4 carbon atoms) and/or a halogen atom linked to a silicon atom (e.g., Si—X, such as for F, Cl, Br, or I). Examples of specific hydrolysable groups include silicon-bound methoxy groups and/or ethoxy groups. The hydrolysable groups are generally all the same to promote a uniform rate of hydrolysis/condensation, but the specific groups can be different in an embodiment if desired to have a distribution of different hydrolysis/condensation (e.g., a silane compound including some methoxy groups and some ethoxy groups). The silane compounds are generally hydrolyzed during curing with atmospheric (ambient) moisture.

In a refinement, the silane compound comprises a (meth)acryloxyalkyltrialkoxysilane such as methacryloxypropyltriethoxysilane. More generally, the silane compound can be represented by $[MA_{a/d}]_y$-$Si(R_7)_{4-y-z}X_z$. The group $MA_{a/d}$ is an MA acceptor or donor group, for example including a linking group between the acceptor/donor group and the silicon atom. Examples of suitable $MA_{a/d}$ groups include the acrylate MA acceptor functional groups described above (e.g., $R_1R_2C=CR_3—C(=O)O—$) and the acetoacetate MA donor functional groups described above (e.g., $R_4C(=O)—CR_5R_6—C(=O)O—$). The $MA_{a/d}$ groups can include a linking group, such as a hydrocarbon or heteroatom-substituted hydrocarbon group containing from 1 to 10 carbon atoms (e.g., at least 1, 2, or 3 and/or up to 4, 6, 8, or 10 carbon atoms), for example forming an ester link with the $MA_{a/d}$ group and an Si—C link with the silicon atom of the silane compound. $R_7$ can be selected from hydrogen (H), hydrocarbons containing from 1 to 20 carbon atoms, and heteroatom-substituted (e.g., N-, O-, P-, or S-substituted) hydrocarbons containing from 1 to 20 carbon atoms. The hydrocarbons and heteroatom-substituted hydrocarbons can be linear, branched, and/or cyclic, aliphatic and/or aromatic, saturated and/or unsaturated, etc., for example having at least 1, 2, 3, 4, 6, 8, or 10 and/or up to 2, 4, 6, 8, 10, 12, 15, or 20 carbon atoms. X is the hydrolysable group, for example an alkoxy group, an aryloxy group, a carboxyloxy group, or a halogen (e.g., having at least having 1, 2, 3, or 4 and/or up to 4, 6, 8, 10, or 12 carbon atoms for non-halogens, where X can be the same or different on any particular silicon atom). Suitably, y is 1 or 2 and z is 1, 2, or 3. When y+z=4, the $R_7$ group is not present.

In a refinement, the photo-latent base (PLB) initiator comprises a photo-latent base precursor and a blocking group (or blocking moiety). Upon irradiation with UV radiation of appropriate spectral emission, the PLB photolyzes and produces a super-base. Sensitizers can be separately added to increase the efficiency of the photolysis process. The photo-latent base precursor forms the corresponding base catalyst as reaction product when the precursor and sensitizer are exposed to UV radiation.

In a refinement, the base catalyst is selected from the group consisting of 1,5-Diazabicyclo[4.3.0]non-5-ene (DBN), 1,8-Diazabicyclo[5.4.0]undec-7-ene (DBU), and combinations thereof. The photo-latent base precursor, corresponding base catalyst, and sensitizer are not particularly limited and are generally known to the skilled artisan. More generally, base catalyst compounds belong to the general category of "amidine bases." Carboxamidines are frequently referred to simply as amidines, as they are the most commonly encountered type of amidine in organic chemistry. Amidines are strong bases (e.g., pKa ranges from 5-13, suitably form 11-13). DBU and DBN have pKa values above 11, and are typically referenced as "super bases." Sensitizers are separately added along with PLB to enhance the efficiency of photo reaction. Isothioxanthone (ITX) is an example of photosensitizer.

In a refinement, the UV-curable composition comprises the polyisocyanate and the polyol.

In a particular refinement, the polyisocyanate comprises a diisocyanate. Suitable polyisocyanates include any organic compound having at least two free isocyanate (—NCO) groups per molecule (e.g., 2, 3, or 4 isocyanate groups, such as an average of 2-4 isocyanate groups per molecule), for example having about 4 to 20 carbon atoms (in addition to nitrogen, oxygen, and hydrogen) and including aliphatic, cycloaliphatic, aryl-aliphatic, and aromatic polyisocyanates, as well as products of their oligomerization, used alone or in mixtures of two or more. Suitable polyisocyanates are diisocyanate compounds, for example having the general form $Y(NCO)_2$, with Y representing aromatic, alicyclic, and/or aliphatic groups (e.g., having at least 2, 4, 6, 8, 10 or 12 and/or up to 8, 12, 16, or 20 carbon atoms), for example a bivalent aliphatic hydrocarbon group having from 4 to 12 carbon atoms, a bivalent cycloaliphatic hydrocarbon group having from 6 to 15 carbon atoms, a bivalent aromatic hydrocarbon group having from 6 to 15 carbon atoms or a bivalent aryl-aliphatic hydrocarbon group having from 7 to 15 carbon atoms. Higher polyisocyanates can provide a higher degree of networking in the cured polymer (e.g., represented by $Y(NCO)_3$ or $Y(NCO)_4$ for 3 or 4 isocyanate groups, respectively, where Y is a trivalent or tetravalent group analogous to that above).

Examples of specific polyisocyanates include 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diiso-cyanate, 1,3-phenylene diisocyanate, 1,4-phenylene diisocyanate, one or more isomers of tolylene diisocyanate (TDI, such as toluene 2,4-diisocyanate), 1-methyl-2,4-diiso-cyanatocyclohexane, 1,6-diisocyanato-2,2,4-trimethyl-hexane, 1,6-diisocyanato-2,4,4-trimethylhexane, 2-methyl-1,5-pentamethylene diisocyanate, 1-iso-cyanatomethyl-3-isocyanato-1,5,5-trimethylcyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (or hexamethylene diisocyanate; HDI), HDI dimer (HDID), HDI trimer (HDIT), HDI biuret, isophorone diisocyanate (IPDI), trimer of isophorone diisocyanate (IPDI trimer), dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethyl-hexamethylene diisocyanate, 1,4-diisocyanato-butane, and 1,12-diisocyanatododecane.

Other classes of isocyanate compounds include reaction products of monomeric diisocyanates (e.g., such as via self-condensation, reaction of a few isocyanate groups with water, or other active H-compounds). This class of materials is generally referenced as a "polyisocyanate" by the skilled artisan. Yet another class includes isocyanate pre-polymers. These are the reaction products of a stoichiometric excess of isocyanate compounds (e.g., diisocyanates) with polyols, thus resulting in an. Isocyanate-functional polyurethane oligomers.

In a particular refinement, the polyol comprises a diol. The polyol is not particularly limited and generally can include any aromatic, alicyclic, and/or aliphatic polyols with at least two reactive hydroxyl/alcohol groups (—OH). Suitable polyol monomers contain on average 2-4 hydroxyl groups on aromatic, alicyclic, and/or aliphatic groups, for example having at least 4, 6, 8, 10 or 12 and/or up to 8, 12, 16, or 20 carbon atoms. In some embodiments, the polyol is a diol. In some embodiments, the polyol is a triol. Examples of specific polyols include one or more of polyether polyols, triethanolamine, hydroxlated (meth)acrylate oligomers (e.g., 2-hydroxylethyl methacrylate or 2-hydroxyethyl acrylate), glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, (meth)acrylic polyols (e.g., having random, block, and/or alternating hydroxyl functionalities along with other (meth)acrylic moieties), polyester polyols, and/or polyurethane polyols. The polyol can be biobased or made of synthetic feedstock. Examples of suitable biobased polyols include isosorbide, poly(lactic acid) having two or more hydroxyl groups, poly(hydroxyalkanaotes) having two or more hydroxyl groups, and biobased poly(esters) having two or more hydroxyl groups (e.g., as terminal groups).

In some embodiments, the UV-curable composition includes at least one tri- or higher functional polyisocyanate and/or at least one tri- or higher functional polyol, for example in addition to or instead of a difunctional polyisocyanate/polyol, Such tri- or higher functional monomers can promote crosslinking within the polyurethane segments of the OIH polymeric composition, which is in addition to any crosslinking and/or network structure in the organic MA reaction products and the inorganic silane condensation products.

In a refinement, exposing the UV-curable composition to UV radiation comprises irradiating the UV-curable composition with at least one of a mercury lamp and a UV-LED source. The irradiation source is not particularly limited, and any source with tieh standard medium pressure mercury lamp (that has a characteristic spectral distribution in UV-A and UV-B region). UV-LED source with wavelength ~365 nm can also be used.

In a refinement, providing the UV-curable composition in part (a) comprises applying the UV-curable composition to a substrate prior to exposing the UV-curable composition to UV radiation; and exposing the UV-curable composition to UV radiation forms a coating of the OIH polymeric composition on the substrate. Suitably, the organic-inorganic hybrid (OIH) polymeric composition can form a protective coating on any of a variety of substrates. The uncured composition can be applied as a liquid mixture to the substrate and then exposed to UV radiation for curing, for example by spraying, dipping, etc. Also, similar to other UV-cure coatings, there is film formation limitation. The film thickness should be such that, under a given type of UV-source, and cure process, UV-radiation should penetrate the entire film thickness. In such cases, it can be desirable to apply coatings in multiple application/curing steps to achieve a final desired thickness in a multilayer coating.

In a further refinement, the substrate comprises a material selected from the group consisting of metals (e.g., steel), alloys thereof, thermoplastic materials, thermoset materials, composite materials, primer materials, glass, wood, fabric (or textile), and ceramic materials. The substrate more generally can include any material other than a cured OIH composition, or it can include a material with a top layer of a cured OIH composition thereon.

In a further refinement, the coating has a thickness in the range of 1 μm to 100 μm. For example, the coating can be at least 1, 2, 5, 10, 15, or 20 μm and/or up to 5, 10, 20, 30, 40, 50, 60, 80, or 100 μm. Typically, a single coating has a thickness up to 25 μm (e.g., 5 μm to 25 μm), and thicker films can be obtained by manipulating coating composition and/or increasing the number of applied layers.

In a refinement, the UV-curable composition further comprises a solvent. Any solvent is generally suitable, for example including aromatic hydrocarbons, oxygenated solvents (e.g., alcohols, ethers, ketones) and their combinations.

In a refinement, the UV-curable composition further comprises one or more additives. Suitable additives can include one or more of non-reactive fillers, reinforcements, mineral extenders, wetting agents, flow control agents, pigments (e.g., organic and/or inorganic), corrosion inhibitors (e.g., organic and/or inorganic).

In a refinement, the MA acceptor compound is present in the UV-curable composition in an amount in a range from 5 to 90 wt. % based on the UV-curable composition; the MA donor compound is present in the UV-curable composition in an amount in a range from 5 to 90 wt. % based on the UV-curable composition; the silane compound is present in the UV-curable composition in an amount in a range from 5 to 90 wt. % based on the UV-curable composition; the photo-latent base initiator is present in the UV-curable composition in an amount in a range from 0.5 to 20 wt. % based on the UV-curable composition when present; the polyisocyanate is present in the UV-curable composition in an amount in a range from 5 to 90 wt. % based on the UV-curable composition; and when present, the polyol is present in the UV-curable composition in an amount in a range from 5 to 90 wt. % based on the UV-curable composition. For example, the MA acceptor compound can be present in an amount of at least 5, 10, 15, 20, 30, 40, 50, or 60 wt. % and/or up to 30, 40, 50, 60, 70, 80 or 90 wt. % based on the UV-curable composition. For example, the MA donor compound can be present in an amount of at least 5, 10, 15, 20, 30, 40, 50, or 60 wt. % and/or up to 30, 40, 50, 60, 70, 80 or 90 wt. % based on the UV-curable composition. For example, the silane compound can be present in an amount of at least 5, 10, 15, 20, 30, 40, 50, or 60 wt. % and/or up to 30, 40, 50, 60, 70, 80 or 90 wt. % based on the UV-curable composition. For example, the photo-latent base initiator can be present in an amount of at least 0.5, 1, 1.5, 2, 3, 4, 5, or 6 wt. % and/or up to 3, 4, 5, 7, 10, 15, or 20 wt. % based on the UV-curable composition. For example, the polyisocyanate can be present in an amount of at least 5, 10, 15, 20, 30, 40, 50, or 60 wt. % and/or up to 30, 40, 50, 60, 70, 80 or 90 wt. % based on the UV-curable composition. For example, the polyol can be present in an amount of at least 5, 10, 15, 20, 30, 40, 50, or 60 wt. % and/or up to 30, 40, 50, 60, 70, 80 or 90 wt. % based on the UV-curable composition. The MA acceptor compound, the MA donor compound, the silane compound, the photo-latent base initiator, the polyisocyanate (when present), and the polyol (when present) collectively constitute at least 80, 90, 95, or 98 wt. % and/or up to 95, 98, 99, or 100 wt. % of the UV-curable composition. The foregoing amount ranges can apply additionally to the amount of each component as incorporated into the eventual cured OIH polymeric composition, whether as a monomer component of the silane/MA component networked polymer, a monomer component of the polyurethane polymer (e.g., as a separate interpenetrating network polymer or covalently bonded to the silane/MA component networked polymer), and/or as remaining components of the photo-latent base initiator after activation.

In another aspect, the disclosure relates to a method of additive manufacturing, the method comprising: applying a first layer of an additive manufacturing component; applying an organic-inorganic hybrid (OIH) polymeric composition according to the foregoing method in any of its variously disclosed embodiments and refinements; and applying a second layer of an additive manufacturing component on the (at least partially cured) OIH polymeric composition. The first layer of the additive manufacturing component can be in a predetermined shape/pattern to constitute a layer component of an overall 3D model or part to be formed. Likewise, the second layer can be in a (different) predetermined shape/pattern to constitute another layer component of the overall 3D model or part to be formed. The first layer can be applied upon an underlying substrate (e.g., when beginning the process) or on an underlying OIH polymeric composition when performing the additive manufacturing method many multiples of times to build the net 3D model or part. The OIH polymeric composition in a given interlayer between first and second layers is generally at least partially cured before the subsequent layer (e.g., the second layer) is applied thereon, although it is generally not completely cured before the subsequent layer is applied thereon (i.e., curing to completion or other final state can proceed after application of the additive manufacturing layers). The materials used for the first, second, etc. layers of the additive manufacturing components are not particularly limited and can include materials typically used in additive manufacturing processes, for example including polymers (e.g., thermoplastics, thermosets), ceramics, glass, metals, etc.

In another aspect, the disclosure relates to an organic-inorganic hybrid (OIH) polymeric composition formed according to the foregoing method according to any of its variously disclosed embodiments and refinements.

In another aspect, the disclosure relates to an organic-inorganic hybrid (OIH) polymeric composition comprising: a base-catalyzed reaction product between: (i) a Michael-addition (MA) acceptor compound comprising at least one MA acceptor functional group, (ii) a Michael-addition (MA) donor compound comprising at least one MA donor functional group, (iii) a silane compound comprising (A) at least one hydrolysable group and (B) at least one of an MA acceptor functional group and an MA donor functional group, (iv) optionally a polyisocyanate comprising at least two isocyanate groups, and (v) optionally a polyol comprising at least two hydroxyl groups. In general, any of the variously disclosed embodiments and refinements set forth above for the corresponding method also apply to the cured composition/coating.

In a refinement of the OIH polymeric composition, the reaction product comprises: MA polymerization bonds between MA acceptor functional groups and MA donor functional groups, anionic polymerization bonds between MA acceptor functional groups, siloxane condensation bonds of silanol groups formed from hydrolysis of the hydrolysable groups, optionally urethane bonds between the polyisocyanate and the polyol, when present, and optionally bonds linking the polyisocyanate and the polyol (or corresponding polyurethane), when present, to the OIH structure (e.g., when the polyol/polyisocyanate include groups reactive with the silane or MA components). The cured OIH polymeric composition in any of the various embodiments can include covalent intermolecular MA polymerization, anionic polymerization, and siloxane polymerization boned (e.g., from chain propagation and crosslinking) in a networked polymer product.

In a refinement of the OIH polymeric composition, the composition further comprises a base catalyst. The base catalyst generated during photolysis, the photolysis product (blocking agent), and the sensitizer are not consumed during the reaction, so these components would generally remain in the final cured composition distributed throughout the matrix.

In an aspect, the disclosure further relates to a method for forming a polymeric composition, the method comprising: (a) providing a UV-curable composition comprising: (i) a Michael-addition (MA) acceptor compound comprising at least one MA acceptor functional group, (ii) a Michael-addition (MA) donor compound comprising at least one MA donor functional group, (iii) a photo-latent base initiator, and (iv) at least one secondary curing compound selected from the group consisting of a polyisocyanate comprising at least two isocyanate groups, a polyol comprising at least two hydroxyl groups, and a silane compound comprising at least two hydrolysable groups; and (b) exposing the UV-curable composition to UV radiation (i) to form a base catalyst from the photo-latent base initiator and (ii) to subsequently catalyze with the base catalyst (A) MA polymerization between MA acceptor functional groups and MA donor functional groups, (B) anionic polymerization between MA acceptor functional groups, and (C) optionally polymerization of the at least one secondary curing compound, thereby forming the polymeric composition.

In a refinement, the MA acceptor compound comprises two or more MA acceptor functional groups.

In a refinement, the MA acceptor functional groups are selected from the group consisting of acrylate groups, methacrylate groups, vinyl groups, and combinations thereof.

In a refinement, the MA acceptor functional groups comprises blocked amine groups.

In a refinement, the MA acceptor compound is selected from the group consisting of trimethylolpropane triacrylate (TMPTA), 1,6-hexanediol diacrylate (HDDA), dipropylene glycol diacrylate (DPGDA), pentaerythritol triacrylate (PETIA), and combinations thereof.

In a refinement, the MA acceptor compound is a ketimine compound.

In a refinement, the MA donor compound comprises two or more MA donor functional groups.

In a refinement, the MA donor functional groups are selected from the group consisting of acetoacetate groups, thiol groups, and combinations thereof.

In a refinement, the MA donor compound is selected from the group consisting of trimethylolpropane triacetoacetate (TMP-AA), 1,6-hexanediol diacetoacetate (HD-AA), dipropylene glycol diacetoacetate (DPG-AA), pentaerythritol triacetoacetate (PET-AA), and combinations thereof.

In a refinement, the photo-latent base (PLB) initiator comprises a photo-latent base precursor and a blocking group.

In a refinement, the base catalyst is selected from the group consisting of 1,5-Diazabicyclo[4.3.0]non-5-ene (DBN), 1,8-Diazabicyclo[5.4.0]undec-7-ene (DBU), and combinations thereof.

In a refinement, the polyisocyanate comprises a diisocyanate.

In a refinement, the polyol comprises a diol.

In a refinement, the at least one MA acceptor functional group comprises an acrylate, the at least one MA donor functional group comprises an acetoacetate, and the at least one secondary curing compound is a polyisocyanate comprising at least two isocyanate groups, and a polyol comprising at least two hydroxyl groups.

In a refinement, the method comprises at least two of: the MA donor functional group, the at least two isocyanates, or the at least two hydroxyl groups are functional groups of a precursor polymer prior to exposing the UV-curable composition to UV radiation; and the at least one secondary curing compound is reactive with the precursor polymer and is a polyisocyanate comprising at least two isocyanate groups or a polyol comprising at least two hydroxyl groups.

In a refinement, the method comprises: at least two of: the MA acceptor functional group, the at least two isocyanates, or the at least two hydroxyl groups are functional groups of a precursor polymer prior to exposing the UV-curable composition to UV radiation; and the at least one secondary curing compound is reactive with the precursor polymer and is a polyisocyanate comprising at least two isocyanate groups or a polyol comprising at least two hydroxyl groups.

In a refinement, the at least one MA acceptor functional group comprises a blocked amine, the at least one MA donor functional group comprises acetoacetate, and the at least one secondary curing compound is a silane compound comprising at least two hydrolysable groups.

In a refinement, exposing the UV-curable composition to UV radiation comprises irradiating the UV-curable composition with at least one of a mercury lamp and a UV-LED source.

In a refinement, the method comprises: providing the UV-curable composition in part (a) comprises applying the UV-curable composition to a substrate prior to exposing the UV-curable composition to UV radiation; and exposing the UV-curable composition to UV radiation forms a coating of the polymeric composition on the substrate.

In a refinement, the substrate comprises a material selected from the group consisting of metals, alloys thereof, thermoplastic materials, thermoset materials, composite materials, primer materials, glass, wood, fabric, and ceramic materials.

In a refinement, the coating has a thickness in the range of 1 μm to 100 μm.

In a refinement, the UV-curable composition further comprises a solvent. In a refinement, wherein the UV-curable composition further comprises one or more additives.

In a refinement, the method comprises: the MA acceptor compound is present in the UV-curable composition in an amount in a range from 5 to 90 wt. % based on the UV-curable composition; the MA donor compound is present in the UV-curable composition in an amount in a range from 5 to 90 wt. % based on the UV-curable composition; the photo-latent base initiator is present in the UV-curable composition in an amount in a range from 0.5 to 20 wt. % based on the UV-curable composition; and the at least one secondary curing compound is present in the UV-curable composition in an amount in a range from 5 to 90 wt. % based on the UV-curable composition.

In another aspect, the disclosure relates to a method of additive manufacturing, the method comprising: applying a first layer of an additive manufacturing component; applying a polymeric composition according to any of the foregoing embodiments on the first layer; and applying a second layer of an additive manufacturing component on the polymeric composition. In an embodiment, one or both of the first and second layers can also be the polymeric composition, for example where multiple layers of the polymeric composition are applied in succession (e.g., with possibly different shapes for different layers) to build an additive manufacturing article with strong interlayer bonding between subsequent layers.

In another aspect, the disclosure relates to a polymeric composition formed according to the methods described above.

In another aspect, the disclosure relates to a polymeric composition comprising: a base-catalyzed reaction product between: (i) a Michael-addition (MA) acceptor compound comprising at least one MA acceptor functional group, (ii) a Michael-addition (MA) donor compound comprising at least one MA donor functional group, (iii) at least one secondary curing compound selected from the group consisting of a polyisocyanate comprising at least two isocyanate groups, a polyol comprising at least two hydroxyl groups, and a silane compound comprising at least two hydrolysable groups. In a refinement, the reaction product comprises: MA polymerization bonds between MA acceptor functional groups and MA donor functional groups, anionic polymerization bonds between MA acceptor functional groups, urethane bonds between the polyisocyanate and the polyol, when present, and siloxane bonds linking the silane compound, when present. In a refinement, the polymeric composition further comprises a base catalyst.

While the disclosed compounds, methods, and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

DETAILED DESCRIPTION

Figure 1:
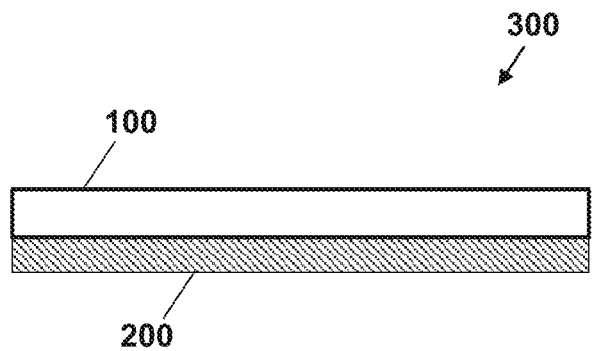
FIG. 1 illustrates a coated article or substrate including an organic-inorganic hybrid (OIH) polymeric composition according to the disclosure.

In one aspect, the disclosure relates to an organic-inorganic hybrid (OIH) polymeric composition and related methods for forming the same. The OIH polymeric composition is generally a networked or crosslinked polymer including a base-catalyzed reaction product between: (i) a Michael-addition (MA) acceptor compound, (ii) a Michael-addition (MA) donor compound, and (iii) a silane compound including a hydrolysable group and an MA acceptor or donor group. The OIH polymeric composition can further include a polyurethane, for example blended with the silane/MA component networked polymer (e.g., not covalently bound thereto, such as an interpenetrating network) or covalently bonded to the silane/MA component networked polymer. The OIH polymeric composition can further include a base catalyst remaining after the curing of its monomer components. The OIH polymeric composition can be formed by UV-irradiating a corresponding composition including the MA acceptor compound, the MA donor compound, the silane compound, and a photo-latent base initiator to form a corresponding base catalyst and catalyze the reactions forming the networked polymer. The OIH polymeric composition can be used as a coating on any of a variety of substrates or as an interlayer in an additive manufacturing process.

The disclosed photo-curable composition and its related curing process can eliminate the above limitations of conventional free-radical type photo-curable coating systems, and it can produce a cross-linked polymer network with tunable properties with substantially more control on network formation. The coating composition in various embodiments can include (i) a photo-base initiator that can generate a base of varying base strength, (ii) a polymeric or oligomeric compound with Michael-addition reaction donor functionality (e.g., acetoacetate functionality, thiol), (iii) a compound with Michael-addition reaction acceptor functionality (e.g., acrylic, vinyl, blocked amine), (iv) a polyisocyanate compound (optional), (v) a hydroxy-functional compound (optional), and (vi) an organosilane compound with Michael-addition and hydrolyzable reactive groups. When the composition is applied and exposed to UV-radiation, a fully-cured coating is formed by a plural-cure mechanism. A hybrid interconnected network is formed which includes organic and inorganic domains at a molecular level. By selecting the content and proportion of organic-inorganic domains (i.e., via the relative amounts of the above components), it is possible to manipulate the thermo-mechanical properties of the resulting cured composition or film.

The coating composition is selected such that a single UV-exposure generates a base catalyst from that in turn can catalyze several different curing reactions that take place concomitantly but completely independently. The different curing reactions can include (i) MA polymerization between MA acceptor functional groups and MA donor functional groups, (ii) anionic polymerization between MA acceptor functional groups, (iii) condensation of silanol groups, and (iv) polyurethane polymerization (i.e., when a polyisocyanate and polyol are included in the coating composition). Furthermore, these curing reactions proceed at different rates and hence the coating cures at much more controllable rate.

Figure 2:
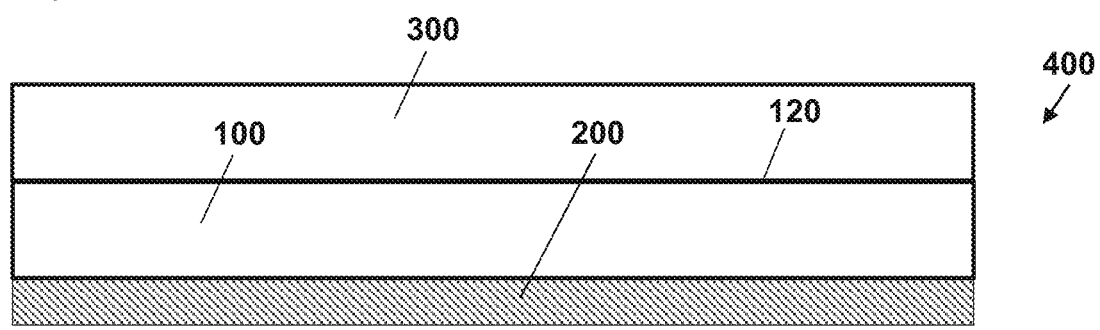
FIG. 2 illustrates an additive manufacturing component incorporating an organic-inorganic hybrid (OIH) polymeric composition according to the disclosure.

The composition can be used as a coating on a substrate as well as in additive manufacturing (3D-printing) applications. For example, the coating composition can be used as a means for inter-layer crosslinking (due to controllable rate of curing) that addresses one of the biggest shortcomings in additive manufacturing processes today. Specifically, the composition can serve as an adhesive between layers used in 3D-printed models where the OIH-based network formation will improve inter-layer strength. The applied coating, once UV cured, would form a semi-solid layer over the substrate. The strength of different layers, once attached together, would improve with passing time as sol-gel curing process continues to take place. Additionally, the composition and process can be useful in coatings, sealants, adhesives, composites etc. with many technical benefits. For example, FIG. 1 depicts a 3D model or part to be formed 300, such as a coated article, wherein a first layer of an organic-inorganic hybrid (OIH) polymeric composition 100 according to the disclosure has been applied on an underlying substrate 200. FIG. 2 depicts a 3D model or part to be formed 400, wherein a first layer of an additive manufacturing component 100 is a first organic-inorganic hybrid (OIH) polymeric composition according to the foregoing method in any of its variously disclosed embodiments and refinements is applied on to an underlying substrate 200; and a second layer of an additive manufacturing component 300 is a second organic-inorganic hybrid (OIH) polymeric composition according to the foregoing method in any of its variously disclosed embodiments and refinements is applied onto the surface of the (at least partially cured) first OIH polymeric composition 120. The organic-inorganic hybrid polymeric composition can be applied many multiples of times to build the net 3D model or part. In another embodiment, the first and second layers 100, 300 can include a conventional additive manufacturing material (e.g., polymers such as thermoplastics or thermosets, ceramics, glass, metals, etc.), and an OIH polymeric composition layer 120 at the interface between the first and second layers 100, 300 improves the interlayer adhesion therebetween.

As previously mentioned, the current UV curing systems have sufficient challenges to overcome such as shrinkage, poor adhesion, and oxygen inhibition. Such challenges often prevent the widespread commercial usage of UV curing technologies. The disclosed composition and method have the ability to offset all these limitations while at the same time providing greater health, safety, and environmental benefits when forming the cured composition. For example, the MA and sol-gel chemistry of the disclosed composition can be used as replacement of the reactive diluents currently used that are based on acrylate monomers. The acrylate monomers are known for their adverse health effects therefore, the system containing MA and sol-gel chemistry would eradicate the health effects problem while at the same time keeping the viscosity of UV-curable formulations low and film properties better than before.

In another aspect, the disclosure relates to a polymeric composition, for example a primary and secondary plural-cure composition, having a base-catalyzed reaction product between (i) a Michael-addition (MA) acceptor compound including at least one MA acceptor functional group, (ii) a Michael-addition (MA) donor compound including at least one MA donor functional group, and (iii) at least one secondary curing compound. The secondary curing compound can be a polyisocyanate including at least two isocyanate groups, a polyol including at least two hydroxyl groups, and a silane compound including at least two hydrolysable groups. The polymeric composition is generally a networked or crosslinked polymer. The polymeric composition can further include a base catalyst remaining after the curing of its monomer components. The polymeric composition can be formed by UV-irradiating a corresponding composition including the MA acceptor compound, the MA donor compound, and a photo-latent base initiator to form a corresponding base catalyst and catalyze the reactions forming the networked polymer. Forming the polymeric composition can include polymerization of the at least one secondary curing compound. The polymeric composition can be used as a coating on any of a variety of substrates or as an interlayer in an additive manufacturing process.

The disclosed photo-curable composition and its related curing processes can eliminate the above limitations of conventional free-radical type photo-curable coating systems, and it can produce a cross-linked polymer network with tunable properties with substantially more control on network formation. The coating composition in various embodiments can include (i) a photo-base initiator that can generate a base of varying base strength, (ii) a polymeric or oligomeric compound with Michael-addition reaction donor functionality (e.g., acetoacetate functionality, thiol), (iii) a compound with Michael-addition reaction acceptor functionality (e.g., acrylic, vinyl, blocked amine), (iv) at least one secondary curing compound (e.g., a polyisocyanate, a polyol, a silane). When the composition is applied and exposed to UV-radiation, a fully-cured coating is formed by a plural-cure mechanism. An interconnected network is formed which can optionally include organic and inorganic domains at a molecular level, if the silane is used as a secondary curing compound. By selecting the content and proportion of the organic or inorganic domains (i.e., via the relative amounts of the above components), it is possible to manipulate the thermo-mechanical properties of the resulting cured composition or film.

The coating composition is selected such that a single UV-exposure generates a base catalyst from that in turn can catalyze several different curing reactions that take place concomitantly but completely independently. The different curing reactions can include (i) MA polymerization between MA acceptor functional groups and MA donor functional groups, (ii) anionic polymerization between MA acceptor functional groups, (iii) condensation of silanol groups (i.e., when a silane is included in the coating composition) and/or polyurethane polymerization (i.e., when a polyisocyanate and polyol are included in the coating composition). Furthermore, these curing reactions proceed at different rates and hence the coating cures at a much more controllable rate.

Figure 3:
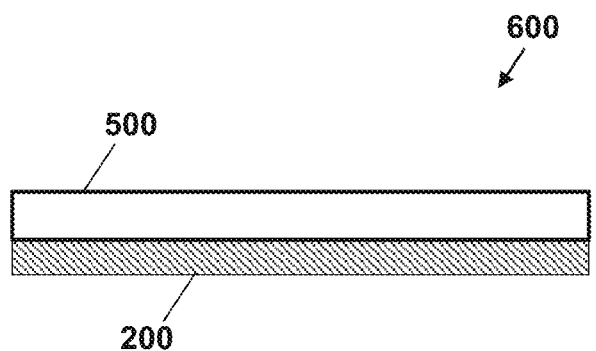
FIG. 3 illustrates a coated article or substrate including a primary and secondary plural-cure polymeric composition according to the disclosure.
Figure 4:
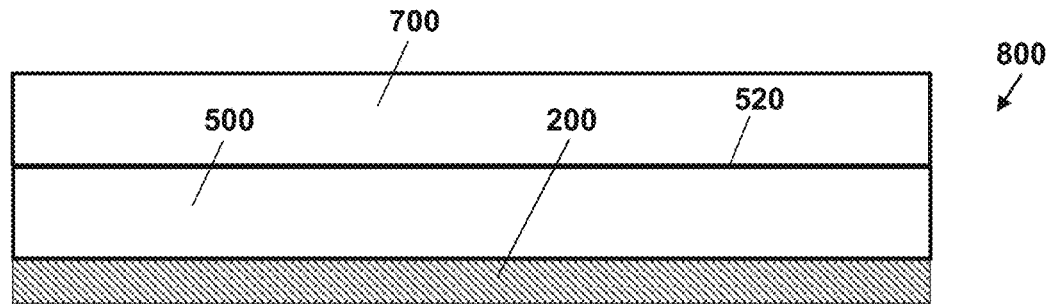
FIG. 4 illustrates an additive manufacturing component incorporating a primary and secondary plural-cure polymeric composition according to the disclosure.

The composition can be used as a coating on a substrate as well as in additive manufacturing (3D-printing) applications. For example, the coating composition can be used as a means for inter-layer crosslinking (due to controllable rate of curing) that addresses one of the biggest shortcomings in additive manufacturing processes today. Specifically, the composition can serve as an adhesive between layers used in 3D-printed models where the polymeric composition network formation will improve inter-layer strength. The applied coating, once UV cured, would form a semi-solid layer over the substrate. The strength of different layers, once attached together, would improve with passing time as sol-gel curing process continues to take place. Additionally, the composition and process can be useful in coatings, sealants, adhesives, composites etc. with many technical benefits. For example, FIG. 3 depicts a 3D model or part to be formed 600, wherein a first layer of a primary and secondary plural-cure polymeric composition 500 according to the disclosure has been applied on to an underlying substrate 200. FIG. 4 depicts a 3D model or part to be formed 800, wherein a first layer of an additive manufacturing component 500 is a first polymeric composition according to the foregoing method in any of its variously disclosed embodiments and refinements is applied on to an underlying substrate 200; and a second layer of an additive manufacturing component 700 is second polymeric composition according to the foregoing method in any of its variously disclosed embodiments and refinements is applied onto the surface of the (at least partially cured) first polymeric composition 520. The polymeric composition can be applied many multiples of times to build the net 3D model or part. In another embodiment, the first and second layers 500, 700 can include a conventional additive manufacturing material (e.g., polymers such as thermoplastics or thermosets, ceramics, glass, metals, etc.), and a primary and secondary plural-cure polymeric composition layer 120 at the interface between the first and second layers 500, 700 improves the interlayer adhesion therebetween.

As previously mentioned, the current UV curing systems have sufficient challenges to overcome such as shrinkage, poor adhesion, and oxygen inhibition. Such challenges often prevent the widespread commercial usage of UV curing technologies. The disclosed composition and method have the ability to offset all these limitations while at the same time providing greater health, safety, and environmental benefits when forming the cured composition. For example, the MA and sol-gel chemistry of the disclosed composition can be used as replacement of the reactive diluents currently used that are based on acrylate monomers. The acrylate monomers are known for their adverse health effects therefore, the system containing MA and sol-gel chemistry would eradicate the health effects problem while at the same time keeping the viscosity of UV-curable formulations low and film properties better than before.

Organic-Inorganic Hybrid (OIH) Polymeric Compositions

Organic-inorganic hybrid polymeric compositions according to the disclosure include a base-catalyzed reaction product between: (i) a Michael-addition (MA) acceptor compound including at least one MA acceptor functional group, (ii) a Michael-addition (MA) donor compound including at least one MA donor functional group, and (iii) a silane compound including (A) at least one hydrolysable group and (B) at least one of an MA acceptor functional group and an MA donor functional group. In embodiments, the OIH polymeric compositions can include a polyisocyanate comprising at least two isocyanate groups. In embodiments, the OIH polymeric compositions can include a polyol comprising at least two hydroxyl groups. In embodiments, the OIH polymeric composition can include both the polyisocyanate having at least two isocyanate groups and the polyol having at least two hydroxyl groups.

The base-catalyzed reaction product can include MA polymerization bonds between MA acceptor functional groups and MA donor functional groups, anionic polymerization bonds between MA acceptor functional groups, siloxane condensation bonds of silanol groups formed from hydrolysis of the hydrolysable groups, optionally urethane bonds between the polyisocyanate and the polyol, when present, and optionally bonds linking the polyisocyanate and the polyol, when present.

MA polymerization between MA acceptor functional groups and MA donor functional groups can include chain propagation and/or crosslinking of organic polymer as well as organic-inorganic links. Likewise, anionic polymerization between MA acceptor functional groups can include chain propagation and/or crosslinking of organic polymer as well as organic-inorganic links. Condensation of silanol groups formed from hydrolysis of the hydrolysable groups can include chain propagation and/or crosslinking of a resulting inorganic network (e.g., Si—O—Si network)). The examples illustrated below generally use alkoxysilanes with an MA acceptor group (e.g., acrylate functional group as illustrated) as the silane compound, but the silane compound alternatively can include an MA donor group (e.g., acetoacetate functional group or otherwise) for incorporation into the organic network.

The OIH composition can be formed using the following method: (a) providing a UV-curable composition including: (i) a Michael-addition (MA) acceptor compound including at least one MA acceptor functional group, (ii) a Michael-addition (MA) donor compound comp including rising at least one MA donor functional group, (iii) a silane compound including (A) at least one hydrolysable group and (B) at least one of an MA acceptor functional group and an MA donor functional group, (iv) a photo-latent base initiator, (v)

optionally a polyisocyanate including at least two isocyanate groups, and (vi) optionally a polyol including at least two hydroxyl groups; and (b) exposing the UV-curable composition to UV radiation (i) to form a base catalyst from the photo-latent base initiator and (ii) to subsequently catalyze with the base catalyst (A) MA polymerization between MA acceptor functional groups and MA donor functional groups, (B) anionic polymerization between MA acceptor functional groups, and (C) condensation of silanol groups formed from hydrolysis of the hydrolysable groups, thereby forming a (cured/networked) organic-inorganic hybrid (OIH) polymeric composition. The OIH composition suitably can be formed with the MA acceptor, the MA donor, and the silane compound as the minimum components; the polyisocyanate and/or the polyol can be included in some embodiments, but are not required. When present, the polyisocyanate and the polyol react to form a polyurethane. The polyisocyanate and the polyol can react/cure independently and need not covalently react with the silane or the MA components/networks. Thus, the result can be an interpenetrating network between the silane/MA component network and the polyurethane. In some embodiments, however, the polyisocyanate and/or the polyol can include a hydrolysable silane group (e.g., alkoxy group) and/or an MA group (e.g., acetoacetate or other MA donor), thus allowing the polyisocyanate, polyol, and/or corresponding polyurethane chain to be covalently incorporated into the network with the silane and MA components.

The UV radiation generates the base catalyst in situ in the UV-curable composition, and then the base catalyst catalyzes the various polymerization reactions, independent of UV radiation. More specifically, there is no need to continuously apply UV radiation throughout the curing process; it need only be applied at the beginning to generate the base catalyst, but curing can proceed over a longer period in the absence of UV radiation, including the various MA polymerization, anionic polymerization, and silanol condensation reactions. In some embodiments, the base catalyst can also catalyze hydrolysis of the silane hydrolysable groups to silanol groups. Similarly in some embodiments, the base catalyst can also catalyze the polyisocyanate/polyol reaction for PU formation and/or some reaction of the polyisocyanate or polyol with other OIH network components, for example when the polyisocyanate and/or polyol include a silane group and/or an MA group.

In a refinement, the MA acceptor compound is present in the UV-curable composition in an amount in a range from 5 to 90 wt. % based on the UV-curable composition; the MA donor compound is present in the UV-curable composition in an amount in a range from 5 to 90 wt. % based on the UV-curable composition; the silane compound is present in the UV-curable composition in an amount in a range from 5 to 90 wt. % based on the UV-curable composition; the photo-latent base initiator is present in the UV-curable composition in an amount in a range from 0.5 to 20 wt. % based on the UV-curable composition when present; the polyisocyanate is present in the UV-curable composition in an amount in a range from 5 to 90 wt. % based on the UV-curable composition; and when present, the polyol is present in the UV-curable composition in an amount in a range from 5 to 90 wt. % based on the UV-curable composition. For example, the MA acceptor compound can be present in an amount of at least 5, 10, 15, 20, 30, 40, 50, or 60 wt. % and/or up to 30, 40, 50, 60, 70, 80 or 90 wt. % based on the UV-curable composition. For example, the MA donor compound can be present in an amount of at least 5, 10, 15, 20, 30, 40, 50, or 60 wt. % and/or up to 30, 40, 50, 60, 70, 80 or 90 wt. % based on the UV-curable composition. For example, the silane compound can be present in an amount of at least 5, 10, 15, 20, 30, 40, 50, or 60 wt. % and/or up to 30, 40, 50, 60, 70, 80 or 90 wt. % based on the UV-curable composition. For example, the photo-latent base initiator can be present in an amount of at least 0.5, 1, 1.5, 2, 3, 4, 5, or 6 wt. % and/or up to 3, 4, 5, 7, 10, 15, or 20 wt. % based on the UV-curable composition. For example, the polyisocyanate can be present in an amount of at least 5, 10, 15, 20, 30, 40, 50, or 60 wt. % and/or up to 30, 40, 50, 60, 70, 80 or 90 wt. % based on the UV-curable composition. For example, the polyol can be present in an amount of at least 5, 10, 15, 20, 30, 40, 50, or 60 wt. % and/or up to 30, 40, 50, 60, 70, 80 or 90 wt. % based on the UV-curable composition. The MA acceptor compound, the MA donor compound, the silane compound, the photo-latent base initiator, the polyisocyanate (when present), and the polyol (when present) collectively constitute at least 80, 90, 95, or 98 wt. % and/or up to 95, 98, 99, or 100 wt. % of the UV-curable composition. The foregoing amount ranges can apply additionally to the amount of each component as incorporated into the eventual cured OIH polymeric composition, whether as a monomer component of the silane/MA component networked polymer, a monomer component of the polyurethane polymer (e.g., as a separate interpenetrating network polymer or covalently bonded to the silane/MA component networked polymer), and/or as remaining components of the photo-latent base initiator after activation.

In another aspect, the disclosure relates to a method of additive manufacturing, the method including: applying a first layer of an additive manufacturing component; applying an organic-inorganic hybrid (OIH) polymeric composition according to the foregoing method in any of its variously disclosed embodiments and refinements; and applying a second layer of an additive manufacturing component on the (at least partially cured) OIH polymeric composition. The first layer of the additive manufacturing component can be in a predetermined shape/pattern to constitute a layer component of an overall 3D model or part to be formed. Likewise, the second layer can be in a (different) predetermined shape/pattern to constitute another layer component of the overall 3D model or part to be formed. The first layer can be applied upon an underlying substrate (e.g., when beginning the process) or on an underlying OIH polymeric composition when performing the additive manufacturing method many multiples of times to build the net 3D model or part. The OIH polymeric composition in a given interlayer between first and second layers is generally at least partially cured before the subsequent layer (e.g., the second layer) is applied thereon, although it is generally not completely cured before the subsequent layer is applied thereon (i.e., curing to completion or other final state can proceed after application of the additive manufacturing layers). The materials used for the first, second, etc. layers of the additive manufacturing components are not particularly limited and can include materials typically used in additive manufacturing processes, for example including polymers (e.g., thermoplastics, thermosets), ceramics, glass, metals, etc. For example, FIG. 2 depicts a 3D model or part to be formed 400, wherein a first layer of an additive manufacturing component 100 is a first organic-inorganic hybrid (OIH) polymeric composition according to any of its variously disclosed embodiments and refinements is applied on to an underlying substrate 200; and a second layer of an additive manufacturing component 300 is a second organic-inorganic hybrid (OIH) polymeric composition according to any of its variously disclosed embodiments and refinements is applied onto the surface of the (at least partially cured) first OIH polymeric composition 120. The organic-inorganic hybrid polymeric composition can be applied many multiples of times to build the net 3D model or part.

In another aspect, the disclosure relates to an organic-inorganic hybrid (OIH) polymeric composition formed according to the foregoing method according to any of its variously disclosed embodiments and refinements.

In a refinement of the OIH polymeric composition, the reaction product includes: MA polymerization bonds between MA acceptor functional groups and MA donor functional groups, anionic polymerization bonds between MA acceptor functional groups, siloxane condensation bonds of silanol groups formed from hydrolysis of the hydrolysable groups, optionally urethane bonds between the polyisocyanate and the polyol, when present, and optionally bonds linking the polyisocyanate and the polyol (or corresponding polyurethane), when present, to the OIH structure (e.g., when the polyol/polyisocyanate include groups reactive with the silane or MA components). The cured OIH polymeric composition in any of the various embodiments can include covalent intermolecular MA polymerization, anionic polymerization, and siloxane polymerization boned (e.g., from chain propagation and crosslinking) in a networked polymer product.

In a refinement of the OIH polymeric composition, the composition further includes a base catalyst. The base catalyst generated during photolysis, the photolysis product (blocking agent), and the sensitizer are not consumed during the reaction, so these components would generally remain in the final cured composition distributed throughout the matrix.

Primary and Secondary Plural-Cure Polymeric Compositions

The methods of forming the polymeric composition can include providing a UV-curable composition including: (i) a Michael-addition (MA) acceptor compound including at least one MA acceptor functional group, (ii) a Michael-addition (MA) donor including comprising at least one MA donor functional group, (iii) a photo-latent base initiator, and (iv) at least one secondary curing compound. The secondary curing compound can include a polyisocyanate with at least two isocyanate groups, a polyol with at least two hydroxyl groups, and a silane compound with at least two hydrolysable groups. The UV-curable composition is then exposed to UV radiation (i) to form a base catalyst from the photo-latent base initiator and (ii) to subsequently catalyze with the base catalyst (A) MA polymerization between MA acceptor functional groups and MA donor functional groups, (B) anionic polymerization between MA acceptor functional groups, and (C) optionally polymerization of the at least one secondary curing compound, thereby forming the polymeric composition. In embodiments, the secondary curing reaction is catalyzed by the base catalyst, albeit at a potentially different rate than the MA reaction (i.e., providing relatively faster and slower curing systems).

MA polymerization between MA acceptor functional groups and MA donor functional groups can include chain propagation and/or crosslinking of organic polymer as well as organic-inorganic links. Likewise, anionic polymerization between MA acceptor functional groups can include chain propagation and/or crosslinking of organic polymer as well as organic-inorganic links if the silane compound is present as one of the at least one secondary curing compounds.

The polymeric composition suitably can be formed with the MA acceptor, the MA donor, a photo-latent base initiator and at least one secondary curing compound at a minimum; wherein there can be more than one secondary curing compound included. In some embodiments, the polyisocyanate and/or the polyol can be included. When present, the polyisocyanate and the polyol react to form a polyurethane. The polyisocyanate and the polyol can react/cure independently and need not covalently react with the MA components/networks. In some embodiments, the silane compound is included with at least two hydrolysable groups. Condensation of silanol groups formed from hydrolysis of the hydrolysable groups can include chain propagation and/or crosslinking of a resulting inorganic network (e.g., Si—O—Si network)). In some embodiments, all secondary curing compounds can be included, wherein the polyisocyanate and the polyol react to form a polyurethane and the condensation of silanol groups form from hydrolysis of the hydrolysable groups. Thus, the result can be an interpenetrating network between the silane/MA component network and the polyurethane. In some embodiments, however, the polyisocyanate and/or the polyol can include a hydrolysable silane group (e.g., alkoxy group) and/or an MA group (e.g., acetoacetate or other MA donor), thus allowing the polyisocyanate, polyol, and/or corresponding polyurethane chain to be covalently incorporated into the network with the silane and MA components. In some embodiments, at least two of: the MA donor functional group, the at least two isocyanates, or the at least two hydroxyl groups are functional groups of a precursor polymer prior to exposing the UV-curable composition to UV radiation; and the at least one secondary curing compound is reactive with the precursor polymer and is a polyisocyanate comprising at least two isocyanate groups or a polyol comprising at least two hydroxyl groups. As shown in the examples below, the MA donor functional group can be an acetoacetate group. In some embodiments, at least two of: the MA acceptor functional group, the at least two isocyanates, or the at least two hydroxyl groups are functional groups of a precursor polymer prior to exposing the UV-curable composition to UV radiation; and the at least one secondary curing compound is reactive with the precursor polymer and is a polyisocyanate comprising at least two isocyanate groups or a polyol comprising at least two hydroxyl groups. As shown in the examples below, the MA acceptor can be an acrylate.

The UV radiation generates the base catalyst in situ in the UV-curable composition, and then the base catalyst catalyzes the various polymerization reactions, independent of UV radiation. More specifically, there is no need to continuously apply UV radiation throughout the curing process; it need only be applied at the beginning to generate the base catalyst, but curing can proceed over a longer period in the absence of UV radiation, including the various MA polymerization, anionic polymerization, and optionally the silanol condensation reactions. In some embodiments, the base catalyst can also catalyze hydrolysis of the silane hydrolysable groups to silanol groups. Similarly in some embodiments, the base catalyst can also catalyze the polyisocyanate/polyol reaction for PU formation and/or some reaction of the polyisocyanate or polyol with other network components, for example when the polyisocyanate and/or polyol include a silane group and/or an MA group.

In a refinement, the MA acceptor compound is present in the UV-curable composition in an amount in a range from 5 to 90 wt. % based on the UV-curable composition; the MA donor compound is present in the UV-curable composition in an amount in a range from 5 to 90 wt. % based on the UV-curable composition; the silane compound is present in the UV-curable composition in an amount in a range from 5 to 90 wt. % based on the UV-curable composition; the photo-latent base initiator is present in the UV-curable composition in an amount in a range from 0.5 to 20 wt. % based on the UV-curable composition when present; and the at least one secondary curing compound is present in the UV-curable composition in an amount in a range from 0.5 to 20 wt. % based on the UV-curable composition. For example, the MA acceptor compound can be present in an amount of at least 5, 10, 15, 20, 30, 40, 50, or 60 wt. % and/or up to 30, 40, 50, 60, 70, 80 or 90 wt. % based on the UV-curable composition. For example, the MA donor compound can be present in an amount of at least 5, 10, 15, 20, 30, 40, 50, or 60 wt. % and/or up to 30, 40, 50, 60, 70, 80 or 90 wt. % based on the UV-curable composition. For example, the silane compound can be present in an amount of at least 5, 10, 15, 20, 30, 40, 50, or 60 wt. % and/or up to 30, 40, 50, 60, 70, 80 or 90 wt. % based on the UV-curable composition. For example, the photo-latent base initiator can be present in an amount of at least 0.5, 1, 1.5, 2, 3, 4, 5, or 6 wt. % and/or up to 3, 4, 5, 7, 10, 15, or 20 wt. % based on the UV-curable composition. For example, the at least one secondary curing composition can be present in an amount of at least 5, 10, 15, 20, 30, 40, 50, or 60 wt. % and/or up to 30, 40, 50, 60, 70, 80 or 90 wt. % based on the UV-curable composition. The MA acceptor compound, the MA donor compound, the at least one secondary curing compound, and the photo-latent base initiator collectively constitute at least 80, 90, 95, or 98 wt. % and/or up to 95, 98, 99, or 100 wt. % of the UV-curable composition. The foregoing amount ranges can apply additionally to the amount of each component as incorporated into the eventual cured polymeric composition, whether as a monomer component of the MA component networked polymer, a monomer component of the polyurethane polymer (e.g., as a separate interpenetrating network polymer or covalently bonded to the MA component networked polymer), and/or as remaining components of the photo-latent base initiator after activation.

In another aspect, the disclosure relates to a method of additive manufacturing, the method including: applying a first layer of an additive manufacturing component; applying a polymeric composition according to the foregoing method in any of its variously disclosed embodiments and refinements; and applying a second layer of an additive manufacturing component on the (at least partially cured) polymeric composition. The first layer of the additive manufacturing component can be in a predetermined shape/pattern to constitute a layer component of an overall 3D model or part to be formed. Likewise, the second layer can be in a (different) predetermined shape/pattern to constitute another layer component of the overall 3D model or part to be formed. The first layer can be applied upon an underlying substrate (e.g., when beginning the process) or on an underlying polymeric composition when performing the additive manufacturing method many multiples of times to build the net 3D model or part. The polymeric composition in a given interlayer between first and second layers is generally at least partially cured before the subsequent layer (e.g., the second layer) is applied thereon, although it is generally not completely cured before the subsequent layer is applied thereon (i.e., curing to completion or other final state can proceed after application of the additive manufacturing layers). The materials used for the first, second, etc. layers of the additive manufacturing components are not particularly limited and can include materials typically used in additive manufacturing processes, for example including polymers (e.g., thermoplastics, thermosets), ceramics, glass, metals, etc. For example, FIG. 4 depicts a 3D model or part to be formed 800, wherein a first layer of an additive manufacturing component 500 is a first polymeric composition according to any of its variously disclosed embodiments and refinements is applied on to an underlying substrate 200; and a second layer of an additive manufacturing component 700 is second polymeric composition according to any of its variously disclosed embodiments and refinements is applied onto the surface of the (at least partially cured) first polymeric composition 520. The polymeric composition can be applied many multiples of times to build the net 3D model or part.

The polymeric composition is formed according to the foregoing method according to any of its variously disclosed embodiments and refinements.

In a refinement of the polymeric composition, the reaction product include: MA polymerization bonds between MA acceptor functional groups and MA donor functional groups, anionic polymerization bonds between MA acceptor functional groups, urethane bonds between the polyisocyanate and the polyol, when present, and siloxane bonds linking the silane compound, when present. The cured polymeric composition in any of the various embodiments can include covalent intermolecular MA polymerization, anionic polymerization, and siloxane polymerization, when present, bonded (e.g., from chain propagation and crosslinking) in a networked polymer product. In an embodiment, the secondary curing compounds (e.g., a polyisocyanate, polyol, or silane compound) can be incorporated into the networked polymer product. In an embodiment, the secondary curing compounds can be formed as entirely separate polymeric network than the MA polymerization, e.g., an interpenetrating polymer network.

In a refinement of the polymeric composition, the composition further comprises a base catalyst. The base catalyst generated during photolysis, the photolysis product (blocking agent), and the sensitizer are not consumed during the reaction, so these components would generally remain in the final cured composition distributed throughout the matrix.

Michael-Addition (MA) Acceptor Compounds

The Michael-addition (MA) acceptor compound is not particularly limited, and it suitably includes any compound having at least one MA acceptor functional group. In a refinement, the MA acceptor compound includes two or more MA acceptor functional groups. Suitably, the MA acceptor compound includes multiple MA acceptor functional groups for organic polymer chain propagation and/or crosslinking. For example, the MA acceptor compound can have at least 2, 3, 4, 6, 8, or 10 and/or up to 3, 4, 6, 8, 10, 12, or 15 MA acceptor functional groups.

In a refinement, the MA acceptor functional groups can include acrylate groups, methacrylate groups, vinyl groups, and combinations thereof. More generally, alpha-, beta-unsaturated compounds (e.g., including acrylates, methacrylates) and ketones are suitable MA acceptors. In a refinement, the MA acceptor functional groups includes blocked amine groups. As used herein, a "blocked amine group" refers to a moisture-blocked nitrogen-containing functional group that is reactive with water (e.g., as atmospheric moisture or otherwise) to form a corresponding amino group. For example, the blocked amine can be a ketimine compound or an oxazolidine compound, which can be substituted or unsubstituted. Unlike other MA acceptor functional groups, the blocked amine undergoes two sets of reactions with different kinetics. The first reaction (1), is the deprotonation of ambient moisture by the base catalyst to form an unblocked amine (e.g., a polyamino compound having at least 2, 3, 4, 6, 8, or 10 and/or up to 3, 4, 6, 8, 10, 12, or 15 amino or —$NH_2$ groups); and the second reaction (2), is the amine attack on the MA donor functional group. Another benefit of the selection of a blocked amine as the MA acceptor is that water generated via silanol condensation of the silane compound is used in the catalyzed hydrolysis of the blocked to form the corresponding unblocked amine, thus facilitating substantially complete through-curing of the coating without solely relying on ambient humidity or moisture for hydrolysis. Thus, as multiple layers are applied in rapid succession in a multilayer coating process or an additive manufacturing process, the internal layers that are no longer directly exposed to the external environment (i.e., and thus have less access to ambient moisture) still continue to cure due to available water from silanol condensation at internal locations of the applied layers. The differential kinetics of the two reactions has been observed such that (1) is very rapid and (2) is relatively slow. Systems capable of such differential kinetics can be very helpful as materials for additive manufacturing (3D printing material). In the layer-by-layer 3D printing process (Stereolithography or SLA), the system having plural-curing and differential kinetic capabilities have significant benefit. A thin layer of this system when exposed to UV radiation quickly solidifies via the rapid kinetic reaction providing strength to the film. This strength enables application of the second layer quickly. In the meantime, as layers are getting built up, the second slow kinetic reaction continue to form a matrix not only in its own layer (X-Y plane) but with also in the layer stacked over it (Z-direction). This will result in inter-layer crosslinking (covalent bonding), that will significantly increase inter-layer adhesion and the overall mechanical properties of the 3D printed product. Thus, such systems are very suitable for addressing one of the major challenges of SLA type 3D printing.

An example of a suitable acrylate MA acceptor functional group is $R_1R_2C=CR_3—C(=O)O—$. $R_1$, $R_2$, and $R_3$ can independently be selected from hydrogen (H), hydrocarbons containing from 1 to 20 carbon atoms, and heteroatom-substituted (e.g., N-, O-, P-, or S-substituted) hydrocarbons containing from 1 to 20 carbon atoms. The hydrocarbons and heteroatom-substituted hydrocarbons can be linear, branched, and/or cyclic, aliphatic and/or aromatic, saturated and/or unsaturated, etc., for example having at least 1, 2, 3, 4, 6, 8, or 10 and/or up to 2, 4, 6, 8, 10, 12, 15, or 20 carbon atoms. Selection of $R_1$, $R_2$, and $R_3$ as H corresponds to an acrylate/acrylic acid functional group. Selection of $R_1$ and $R_2$ as H and $R_3$ as $CH_3$ corresponds to an methacrylate/methacrylic acid functional group.

An example of a corresponding acrylate-based MA acceptor compound is $[R_1R_2C=CR_3—C(=O)O—]_m—H_a$. The index m can have a value or 1 (e.g., for a mono-functional acceptor) or 2 or more (e.g., for a poly-functional acceptor), for example being at least 2, 3, 4, 6, 8, or 10 and/or up to 3, 4, 6, 8, 10, 12, or 15. The $H_a$ group as an organic core or body portion of the eventual cured composition can include hydrocarbons containing from 1 to 50 carbon atoms, and heteroatom-substituted (e.g., N-, O-, P-, or S-substituted) hydrocarbons containing from 1 to 50 carbon atoms. The hydrocarbons and heteroatom-substituted hydrocarbons can be linear, branched, and/or cyclic, aliphatic and/or aromatic, saturated and/or unsaturated, etc., for example having at least 1, 2, 3, 4, 6, 8, 10, or 20 and/or up to 2, 4, 6, 8, 10, 15, 20, 30, 40, or 50 carbon atoms.

In a refinement, the MA acceptor compound can include trimethylolpropane triacrylate (TMPTA), 1,6-hexanediol diacrylate (HDDA), dipropylene glycol diacrylate (DPGDA), pentaerythritol triacrylate (PETIA), and combinations thereof. The MA acceptor compound additionally can include polymeric or oligomeric compounds with (meth) acrylate functional groups and combinations thereof, for example including polymers or oligomers of the foregoing monomers. More generally, the MA acceptor compound can be an ester reaction product between (for example) an acrylic acid compound (e.g., $R_1R_2C=CR_3—C(=O)OH$ with $R_1$, $R_2$, and $R_3$ as defined above) and a polyol Suitable polyols can include the same as those used in forming a polyurethane portion of the eventual cured composition. Similarly, the MA acceptor compound can be an urethane reaction product between (for example) a hydroxyalkyl-functionalized acrylic acid compound (e.g., $R_1R_2C=CR_3—C(=O)OR'$ with $R_1$, $R_2$, and $R_3$ as defined above and R' being a hydroxyalkyl group with 1 to 10 carbon atoms, for example 2-hydroxyethyl) and a polyisocyanate Suitable polyisocyanates can include the same as those used in forming a polyurethane portion of the eventual cured composition. Other MA acceptor compounds can include acrylate-functionalized compounds such as polyester acrylates, (poly)urethane acrylates, etc.

An example of a suitable blocked amine MA acceptor functional group is a ketimine such as $R_1R_2C=NR_3$. $R_1$ and $R_2$ can independently be selected from hydrocarbons containing from 1 to 20 carbon atoms, and heteroatom-substituted (e.g., N-, O-, P-, or S-substituted) hydrocarbons containing from 1 to 20 carbon atoms. $R_3$ can be selected from hydrogen (H), hydrocarbons containing from 1 to 20 carbon atoms, and heteroatom-substituted (e.g., N-, O-, P-, or S-substituted) hydrocarbons containing from 1 to 20 carbon atoms. The hydrocarbons and heteroatom-substituted hydrocarbons can be linear, branched, and/or cyclic, aliphatic and/or aromatic, saturated and/or unsaturated, etc., for example having at least 1, 2, 3, 4, 6, 8, or 10 and/or up to 2, 4, 6, 8, 10, 12, 15, or 20 carbon atoms. Selection of $R_1$ and $R_2$ as $CH_3$ corresponds to a ketimine analog of acetone (e.g., formed by reaction of acetone with an $R_3$—$NH_2$ amine). Similarly, selection of $R_1$ and $R_2$ as $CH_3$ and $C_2H_5$, respectively, corresponds to a ketimine analog of methylethylketone (e.g., formed by reaction of methylethylketone with an $R_3$—$NH_2$ amine). Selection of $R_3$ as H corresponds to a primary ketimine. Selection of $R_3$ as hydrocarbons containing from 1 to 20 carbon atoms, and heteroatom-substituted (e.g., N-, O-, P-, or S-substituted) hydrocarbons containing from 1 to 20 carbon atoms corresponds to a secondary ketimine.

In a refinement, the MA acceptor compound can include one or more of a ketimine group and an oxazolidine group. The MA acceptor compound additionally can include polymeric or oligomeric compounds with blocked amine functional groups and combinations of a blocked amine group and other MA acceptor functional groups, for example including polymers or oligomers of the foregoing monomers.

Michael-Addition (MA) Donor Compounds

The Michael-addition (MA) donor compound is not particularly limited, and it suitably includes any compound having at least one MA donor functional group. In a refinement, the MA donor compound includes two or more MA donor functional groups. Suitably, the MA donor compound includes multiple MA donor functional groups for organic polymer chain propagation and/or crosslinking. For example, the MA donor compound can have at least 2, 3, 4, 6, 8, or 10 and/or up to 3, 4, 6, 8, 10, 12, or 15 MA donor functional groups.

In a refinement, the MA donor functional groups can include acetoacetate groups, thiol groups, and combinations thereof. More generally, nucleophiles, such as amines (e.g., aza-Michael addition, thiols (mercaptans), and acetoacetate-functional compounds are suitable MA donors.

An example of a suitable acetoacetate MA donor functional group is $R_4C(=O)-CR_5R_6-C(=O)O-$. $R_4$, $R_5$, and $R_6$ can independently be selected from hydrogen ($R_5$ and $R_6$ only), hydrocarbons containing from 1 to 20 carbon atoms, and heteroatom-substituted (e.g., N-, O-, P-, or S-substituted) hydrocarbons containing from 1 to 20 carbon atoms. The hydrocarbons and heteroatom-substituted hydrocarbons can be linear, branched, and/or cyclic, aliphatic and/or aromatic, saturated and/or unsaturated, etc., for example having at least 1, 2, 3, 4, 6, 8, or 10 and/or up to 2, 4, 6, 8, 10, 12, 15, or 20 carbon atoms. Selection of $R_4$ as $CH_3$ and $R_5$ and $R_6$ as H and corresponds to an unsubstituted acetoacetate functional group.

An example of a corresponding acetoacetate-based MA donor compound is $[R_4C(=O)-CR_5R_6-C(=O)O-]_n-H_d$. The index n can have a value or 1 (e.g., for a mono-functional donor) or 2 or more (e.g., for a poly-functional donor), for example being at least 2, 3, 4, 6, 8, or 10 and/or up to 3, 4, 6, 8, 10, 12, or 15. The $H_d$ group as an organic core or body portion of the eventual cured composition can include hydrocarbons containing from 1 to 50 carbon atoms, and heteroatom-substituted (e.g., N-, O-, P-, or S-substituted) hydrocarbons containing from 1 to 50 carbon atoms. The hydrocarbons and heteroatom-substituted hydrocarbons can be linear, branched, and/or cyclic, aliphatic and/or aromatic, saturated and/or unsaturated, etc., for example having at least 1, 2, 3, 4, 6, 8, 10, or 20 and/or up to 2, 4, 6, 8, 10, 15, 20, 30, 40, or 50 carbon atoms.

In a refinement, the MA donor compound can include trimethylolpropane triacetoacetate (TMP-AA), 1,6-hexanediol diacetoacetate (HD-AA), dipropylene glycol diacetoacetate (DPG-AA), pentaerythritol triacetoacetate (PET-AA), and combinations thereof. The MA donor compound additionally can include acetoacetate-functionalized forms of polymeric polyols, such as polyester polyols, polyurethane polyols, polyether polyols, polyacrylate polyols. More generally, the MA donor compound can be an ester reaction product between (for example) an acetoacetate compound (e.g., $R_4C(=O)-CR_5R_6-C(=O)OH$ or $R_4C(=O)-CR_5R_6-C(=O)O-(t-C_4H_9)$ with $R_4$, $R_5$, and $R_6$ as defined above) and a polyol For example, t-butyl acetoacetate can be used to form transesterification products with polyols including a polyfunctional MA donor compound and t-butanol. Suitable polyols can include the same as those used in forming a polyurethane portion of the eventual cured composition.

Silane Compounds

The silane compound is not particularly limited, and it suitably includes any silane compound having at least one hydrolysable group. In a refinement, the silane compound includes two or more hydrolysable groups. Suitably, the silane compound includes multiple hydrolysable groups for inorganic network chain propagation and/or crosslinking. For example, a silane compound with a single silicon atom can have 2 or 3 hydrolysable groups. Similarly, a silane compound with a multiple silicon atoms can have an average of at least 1.5 or 2 and/or up to 3 or 3.5 hydrolysable groups per silicon atom. The form of the silane compound is not particularly limited, for example including any suitable organosilicon (e.g., containing Si—C bonds) and/or siloxane (e.g., containing Si—O bonds) structures with at least one of the silicon atoms having hydrolysable group(s) bound thereto. More generally, a silane compound with one or more silicon atoms can have at least 2, 3, 4, 6, 8, or 10 and/or up to 3, 4, 6, 8, 10, 12, or 15 hydrolysable groups total.

In some embodiments, the silane compound includes at least one MA acceptor/donor group, for example for incorporation into the OIH network of the OIH polymer composition. For example, a silane compound with a single silicon atom can have 1 or 2 MA acceptor/donor groups (e.g., 1 donor, 1 acceptor, 2 donors, 2 acceptors, 1 donor and 1 acceptor). Similarly, a silane compound with a multiple silicon atoms can have an average of at least 0.5 or 1 and/or up to 1.5 or 2 MA acceptor/donor groups per silicon atom. Similar to above with a generic silane compound including any suitable organosilicon (Si—C) and/or siloxane (Si—O) structures, the MA acceptor/donor group(s) can be bound thereto at any suitable location, for example at a carbon atom of a carbon linking group between the MA acceptor/donor group(s) and a silicon atom. More generally, a silane compound with one or more silicon atoms can have at least 1, 2, 3, 4, or 6 and/or up to 2, 4, 6, or 10 MA acceptor/donor groups total. In other embodiments, the silane compound does not include any MA acceptor/donor groups, for example a primary and secondary plural-cure composition without an OIH network.

In a refinement, the hydrolysable groups can include alkoxy groups, aryloxy groups, carboxyloxy groups, halogens, and combinations thereof. The hydrolysable (silyl) groups include functional groups attached to a silicon atom (e.g., 1, 2, or 3 functional hydrolysable groups per silicon atom) that can be hydrolyzed under suitable conditions (e.g., when in contact with water, such as when exposed to atmospheric moisture, under acidic conditions, etc.) to form corresponding silanol (Si—OH) functional groups, which in turn can be condensed to form siloxane (Si—O—Si) functional groups/linkages in a cured OIH composition/coating, thus forming the inorganic portion of the composition. The hydrolysable group can include a hydrocarbon group linked via an oxygen atom to a silicon atom (e.g., Si—OR, such as alkoxy groups having 1, 2, 3, or 4 carbon atoms) and/or a halogen atom linked to a silicon atom (e.g., Si—X, such as for F, Cl, Br, or I). Examples of specific hydrolysable groups include silicon-bound methoxy groups and/or ethoxy groups. The hydrolysable groups are generally all the same to promote a uniform rate of hydrolysis/condensation, but the specific groups can be different in an embodiment if desired to have a distribution of different hydrolysis/condensation (e.g., a silane compound including some methoxy groups and some ethoxy groups). The silane compounds are generally hydrolyzed during curing with atmospheric (ambient) moisture.

In a refinement, the silane compound includes a (meth)acryloxyalkyltrialkoxysilane such as methacryloxypropyltriethoxysilane, for example when the silane compound includes an MA acceptor or donor group. In another refinement, the silane compound includes a substituted or unsubstituted alkyltrialkoxysilane such as methyltrimethoxysilane or (3-glycidyloxypropyl)trimethoxysilane, for example when the silane compound does not include an MA acceptor or donor group. More generally, the silane compound can be represented by $[MA_{a/d}]_y-Si(R_7)_{4-y-z}X_z$. The group $MA_{a/d}$ is an MA acceptor or donor group, for example including a linking group between the acceptor/donor group and the silicon atom. Examples of suitable $MA_{a/d}$ groups include the acrylate MA acceptor functional groups described above (e.g., $R_1R_2C=CR_3-C(=O)O-$) and the acetoacetate MA donor functional groups described above (e.g., $R_4C(=O)-CR_5R_6-C(=O)O-$). The $MA_{a/d}$ groups can include a linking group, such as a hydrocarbon or heteroatom-substituted hydrocarbon group containing from 1 to 10 carbon atoms (e.g., at least 1, 2, or 3 and/or up to 4, 6, 8, or 10 carbon atoms), for example forming an ester link with the $MA_{a/d}$ group and an Si—C link with the silicon atom of the silane compound. $R_7$ can be selected from hydrogen (H), hydrocarbons containing from 1 to 20 carbon atoms, and heteroatom-substituted (e.g., N-, O-, P-, or S-substituted) hydrocarbons containing from 1 to 20 carbon atoms. The hydrocarbons and heteroatom-substituted hydrocarbons can be linear, branched, and/or cyclic, aliphatic and/or aromatic, saturated and/or unsaturated, etc., for example having at least 1, 2, 3, 4, 6, 8, or 10 and/or up to 2, 4, 6, 8, 10, 12, 15, or 20 carbon atoms. X is the hydrolysable group, for example an alkoxy group, an aryloxy group, a carboxyloxy group, or a halogen (e.g., having at least having 1, 2, 3, or 4 and/or up to 4, 6, 8, 10, or 12 carbon atoms for non-halogens, where X can be the same or different on any particular silicon atom). Suitably, y is 1 or 2 and z is 1, 2, or 3 for embodiments with at least one MA acceptor or donor group. In other embodiments without an MA acceptor or donor group, y is 0 and z is 1, 2, 3, or 4. When y+z=4, the $R_7$ group is not present.

Photo-Latent Base (PLB) Compounds

Photo-latent base (PLB) systems and related compounds are generally known in the art. In a refinement, the photo-latent base initiator includes a photo-latent base precursor and a blocking group (or blocking moiety). Upon irradiation with UV radiation of appropriate spectral emission, the PLB photolyzes and produces a super-base. Sensitizers can be separately added to increase the efficiency of the photolysis process. The photo-latent base precursor forms the corresponding base catalyst as reaction product when the precursor and sensitizer are exposed to UV radiation.

In a refinement, the base catalyst can include 1,5-Diazabicyclo[4.3.0]non-5-ene (DBN), 1,8-Diazabicyclo[5.4.0]undec-7-ene (DBU), and combinations thereof. The photo-latent base precursor, corresponding base catalyst, and sensitizer are not particularly limited and are generally known to the skilled artisan. More generally, base catalyst compounds belong to the general category of "amidine bases." Carboxamidines are frequently referred to simply as amidines, as they are the most commonly encountered type of amidine in organic chemistry. Amidines are strong bases (e.g., pKa ranges from 5-13, suitably form 11-13). DBU and DBN have pKa values above 11, and are typically referenced as "super bases." Sensitizers are separately added along with PLB to enhance the efficiency of photo reaction. Isothioxanthone (ITX) is an example of photosensitizer.

Polyisocyanate and Polyol Compounds

The polyfunctional isocyanate (or polyisocyanate) and polyfunctional hydroxy (or polyol) compounds suitable for forming a corresponding polyurethane are not particularly limited and are generally known in the art. In some embodiments, the polyisocyanate and polyol compounds are selected such that they react and polymerize independently of the MA donor/acceptor compounds (i.e., as a separate polymeric network). In other embodiments, the polyisocyanate and polyol compounds are selected such that they react and polymerize with each other and with at least one of the MA donor/acceptor compounds (i.e., as a combined polymeric network).

In a particular refinement, the polyisocyanate includes a diisocyanate. Suitable polyisocyanates include any organic compound having at least two free isocyanate (—NCO) groups per molecule (e.g., 2, 3, or 4 isocyanate groups, such as an average of 2-4 isocyanate groups per molecule), for example having about 4 to 20 carbon atoms (in addition to nitrogen, oxygen, and hydrogen) and including aliphatic, cycloaliphatic, aryl-aliphatic, and aromatic polyisocyanates, as well as products of their oligomerization, used alone or in mixtures of two or more. Suitable polyisocyanates are diisocyanate compounds, for example having the general form $Y(NCO)_2$, with Y representing aromatic, alicyclic, and/or aliphatic groups (e.g., having at least 2, 4, 6, 8, 10 or 12 and/or up to 8, 12, 16, or 20 carbon atoms), for example a bivalent aliphatic hydrocarbon group having from 4 to 12 carbon atoms, a bivalent cycloaliphatic hydrocarbon group having from 6 to 15 carbon atoms, a bivalent aromatic hydrocarbon group having from 6 to 15 carbon atoms or a bivalent aryl-aliphatic hydrocarbon group having from 7 to 15 carbon atoms. Higher polyisocyanates can provide a higher degree of networking in the cured polymer (e.g., represented by $Y(NCO)_3$ or $Y(NCO)_4$ for 3 or 4 isocyanate groups, respectively, where Y is a trivalent or tetravalent group analogous to that above).

Examples of specific polyisocyanates include 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diiso-cyanate, 1,3-phenylene diisocyanate, 1,4-phenylene diisocyanate, one or more isomers of tolylene diisocyanate (TDI, such as toluene 2,4-diisocyanate), 1-methyl-2,4-diiso-cyanatocyclohexane, 1,6-diisocyanato-2,2,4-trimethyl-hexane, 1,6-diisocyanato-2,4,4-trimethylhexane, 2-methyl-1,5-pentamethylene diisocyanate, 1-iso-cyanatomethyl-3-isocyanato-1,5,5-trimethylcyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (or hexamethylene diisocyanate; HDI), HDI dimer (HDID), HDI trimer (HDIT), HDI biuret, isophorone diisocyanate (IPDI), trimer of isophorone diisocyanate (IPDI trimer), dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, and 1,12-diisocyanatododecane.

Other classes of isocyanate compounds include reaction products of monomeric diisocyanates (e.g., such as via self-condensation, reaction of a few isocyanate groups with water, or other active H-compounds). This class of materials is generally referenced as a "polyisocyanate" by the skilled artisan. Yet another class includes isocyanate pre-polymers. These are the reaction products of a stoichiometric excess of isocyanate compounds (e.g., diisocyanates) with polyols, thus resulting in isocyanate-functional polyurethane oligomers.

In a particular refinement, the polyol includes a diol. The polyol is not particularly limited and generally can include any aromatic, alicyclic, and/or aliphatic polyols with at least two reactive hydroxyl/alcohol groups (—OH). Suitable polyol monomers contain on average 2-4 hydroxyl groups on aromatic, alicyclic, and/or aliphatic groups, for example having at least 4, 6, 8, 10 or 12 and/or up to 8, 12, 16, or 20 carbon atoms. In some embodiments, the polyol is a diol. In some embodiments, the polyol is a triol. Examples of specific polyols include one or more of polyether polyols, triethanolamine, hydroxlated (meth)acrylate oligomers (e.g., 2-hydroxylethyl methacrylate or 2-hydroxyethyl acrylate), glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, (meth)acrylic polyols (e.g., having random, block, and/or alternating hydroxyl functionalities along with other (meth)acrylic moieties), polyester polyols, and/or polyurethane polyols. The polyol can be biobased or made of synthetic feedstock. Examples of suitable biobased polyols include isosorbide, poly(lactic acid) having two or more hydroxyl groups, poly(hydroxyalkanaotes) having two or more hydroxyl groups, and biobased poly(esters) having two or more hydroxyl groups (e.g., as terminal groups).

In some embodiments, the UV-curable composition includes at least one tri- or higher functional polyisocyanate and/or at least one tri- or higher functional polyol, for example in addition to or instead of a difunctional polyisocyanate/polyol, Such tri- or higher functional monomers can promote crosslinking within the polyurethane segments of the polymeric composition, which is in addition to any crosslinking and/or network structure in the organic MA reaction products and the inorganic silane condensation products.

Additional Features

In a refinement, exposing the UV-curable composition to UV radiation includes irradiating the UV-curable composition with at least one of a mercury lamp and a UV-LED source. The irradiation source is not particularly limited, and any source having a characteristic spectral distribution in UV-A and UV-B region can be used. A UV-LED source with wavelength ~365 nm can also be used.

In a refinement, providing the UV-curable composition includes applying the UV-curable composition to a substrate prior to exposing the UV-curable composition to UV radiation; and exposing the UV-curable composition to UV radiation forms a coating of the polymeric composition on the substrate. Suitably, the polymeric composition, for example an OIH composition or a primary and secondary plural-cure composition, can form a protective coating on any of a variety of substrates. The uncured composition can be applied as a liquid mixture to the substrate and then exposed to UV radiation for curing, for example by spraying, dipping, etc. Also, similar to other UV-cure coatings, there is film formation limitation. The film thickness should be such that, under a given type of UV-source, and cure process, UV-radiation should penetrate the entire film thickness. In such cases, it can be desirable to apply coatings in multiple application/curing steps to achieve a final desired thickness in a multilayer coating. For example, FIG. 1 shows a 3D model or part to be formed 300, wherein a first layer of an organic-inorganic hybrid (OIH) polymeric composition 100 according to any of its variously disclosed embodiments and refinements has been applied on to an underlying substrate 200. Similarly, FIG. 3 shows a 3D model or part to be formed 600, wherein a first layer of a primary and secondary plural-cure polymeric composition 500 according to the disclosure has been applied on to an underlying substrate 200.

In a further refinement, the substrate can include any of various materials such as metals (e.g., steel), alloys thereof, thermoplastic materials, thermoset materials, composite materials, primer materials, glass, wood, fabric (or textile), and ceramic materials. The substrate more generally can include any material other than a cured polymeric composition, or it can include a material with a top layer of a cured polymeric composition according to the disclosure thereon.

In a further refinement, the coating has a thickness in the range of 1 μm to 100 μm. For example, the coating can be at least 1, 2, 5, 10, 15, or 20 μm and/or up to 5, 10, 20, 30, 40, 50, 60, 80, or 100 μm. Typically, a single coating has a thickness up to 25 μm (e.g., 5 μm to 25 μm), and thicker films can be obtained by manipulating coating composition and/or increasing the number of applied layers.

In a refinement, the UV-curable composition further includes a solvent. Any solvent is generally suitable, for example including aromatic hydrocarbons, oxygenated solvents (e.g., alcohols, ethers, ketones) and their combinations.

In a refinement, the UV-curable composition further includes one or more additives. Suitable additives can include one or more of non-reactive fillers, reinforcements, mineral extenders, wetting agents, flow control agents, pigments (e.g., organic and/or inorganic), corrosion inhibitors (e.g., organic and/or inorganic).

EXAMPLES

The following examples illustrate the disclosed compositions and methods, but are not intended to limit the scope of any claims thereto. In the following examples, polymeric compositions generally according to the disclosure are prepared and applied as a film or coating on a test substrate.

Example 1—Organic-Inorganic Hybrid Polymeric Compositions

Figure 5:
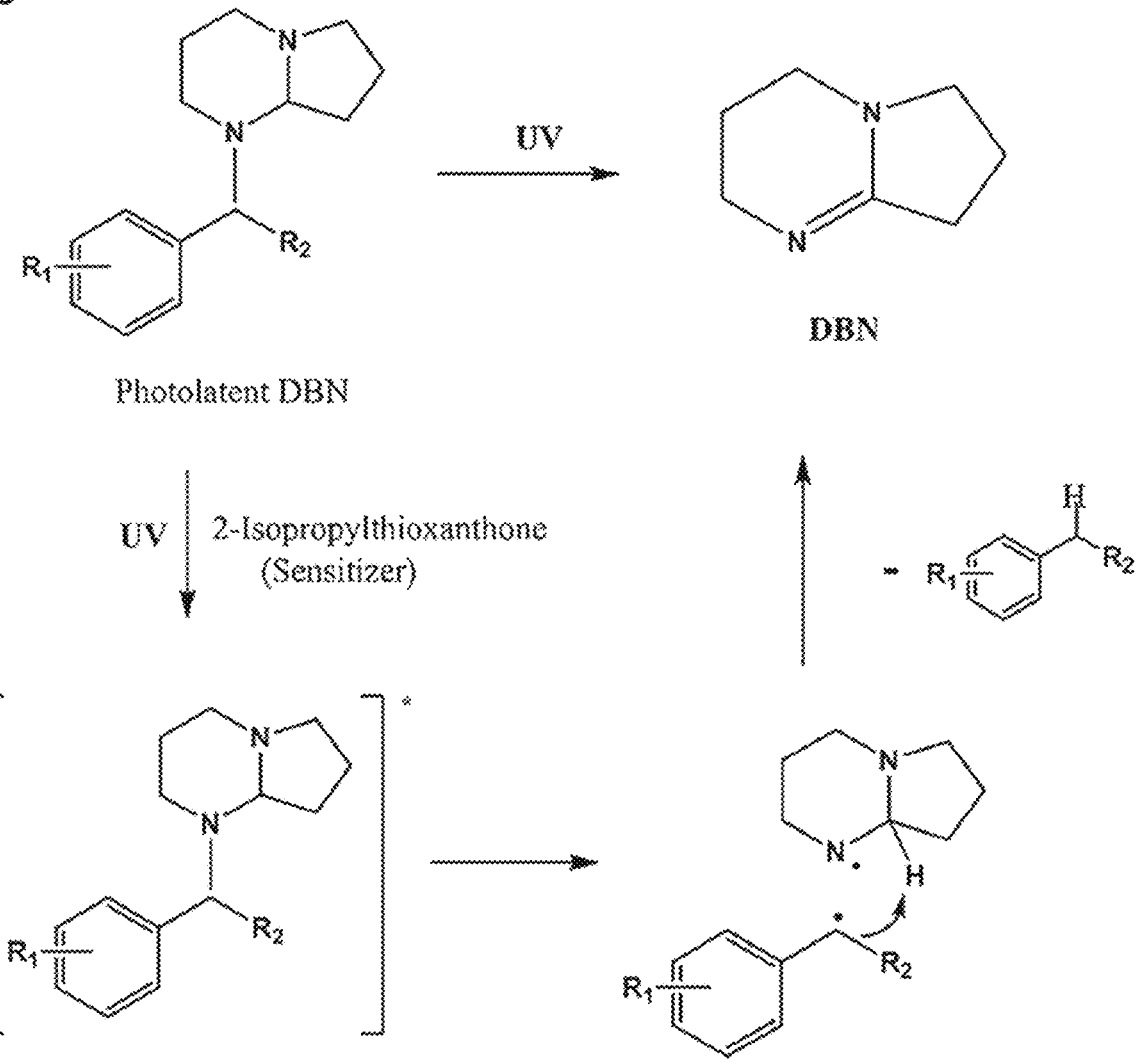
FIG. 5 illustrates the photo-release of DBN (1, 5-diazabi-cyclo [4.3.0] non-5-ene) from N-benzylated precursors in a representative PLB system.
Figure 6:
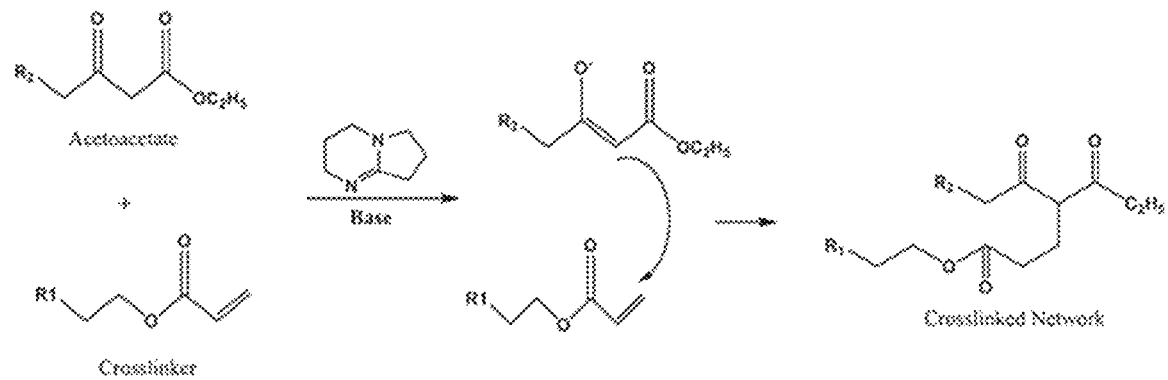
FIG. 6 illustrates a base-catalyzed Michael Addition (MA) reaction mechanism according to the disclosure.
Figure 7:
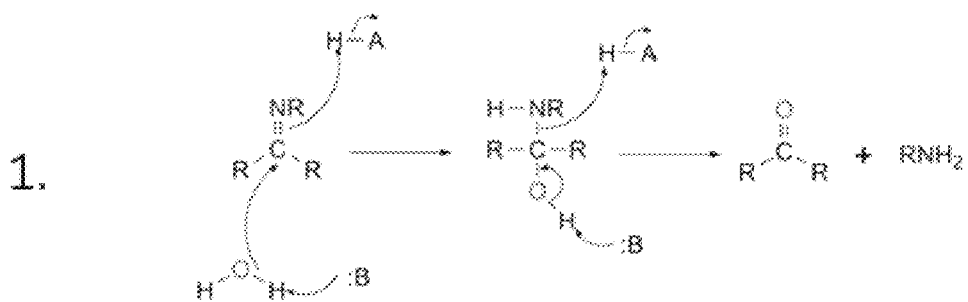
FIG. 7 illustrates a base-catalyzed Aza-Michael Addition (MA) reaction mechanism according to the disclosure, including (1) base-catalyzed hydrolysis and conversion of a blocked amine as an MA acceptor (e.g., a ketimine compound) to a primary amine compound (e.g., using ambient moisture), and (2) Michael addition reaction between the primary amine and an acetoacetate as an MA donor.
Figure 7:
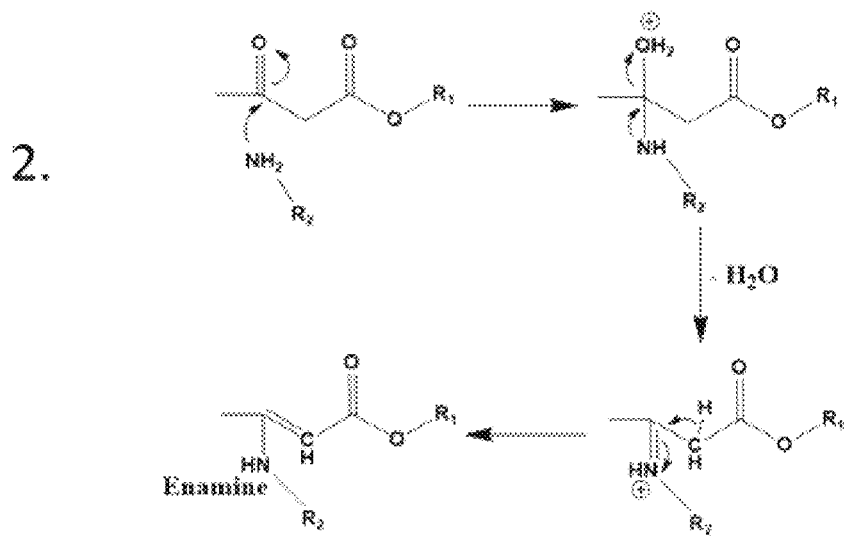
Figure 8:
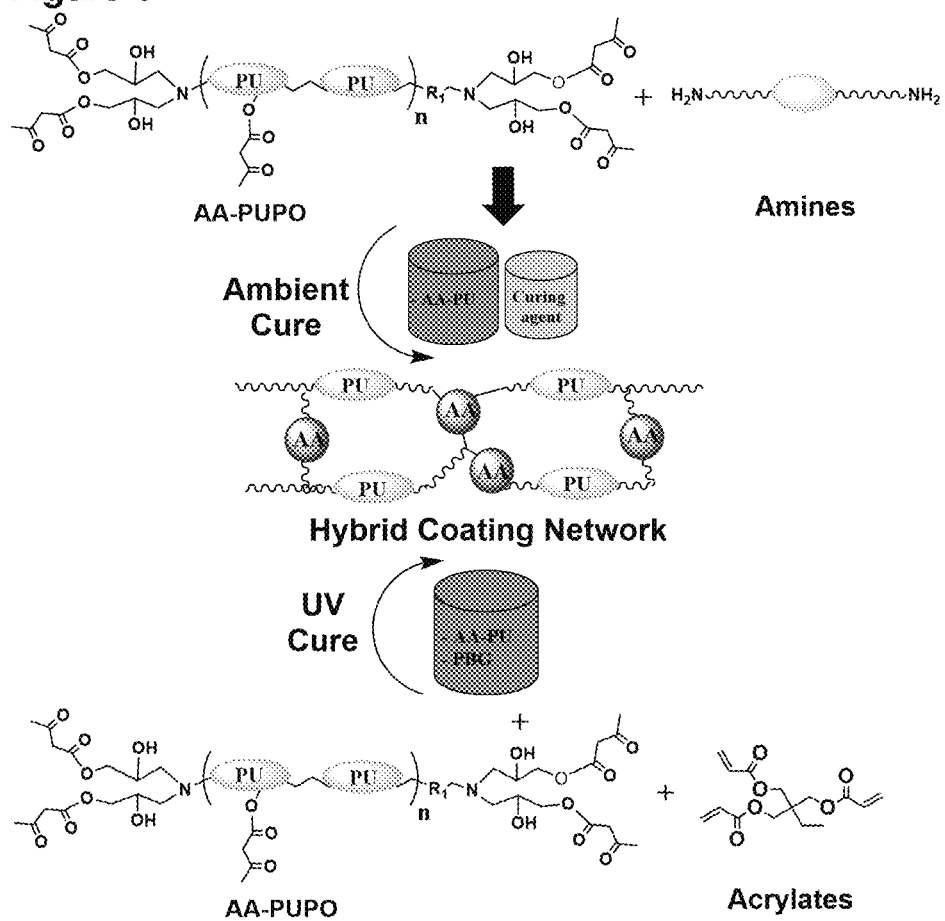
FIG. 8 depicts two separate reactions. The top reaction shows a acetoacetate (AA) polyurethane (PU) polyol polymeric compound reacting with a polyfunctional amine (e.g., after base-catalyzed conversion of a blocked amine) that results in an example of a polymeric composition as disclosed herein (hybrid coating network). The bottom reaction shows an acetoacetate (AA) polyurethane (PU) polyol polymeric compound reacting with an acrylate compound resulting in an example of a polymeric composition as disclosed herein.

This example illustrates the use of a super photo-base generator (PBG) in catalyzing concomitant but independent reactions to develop organic-inorganic hybrid (OIH) coating networks by leveraging plural-cure chemistry. The super PBG is used to initiate both Michael-addition (MA) reaction and sol-gel reaction concurrently, upon exposure to the UV source. Coatings are formulated using acrylate functional oligomers (MA-acceptor), acetoacetate functional reactive diluents (MA-donors) and organo-silanes (sol-gel precursors), in addition to the super PBG. Cross-linked networks are formed using photo-triggered base catalyzed reactions instead of photo-induced free-radical polymerization. The mechanism of base-catalyzed polymerization eliminates the usage of free-radicals by using anions and therefore, the problem of oxygen inhibition is directly solved. FIG. 5 illustrates the photo-release of DBN (1, 5-diazabicyclo [4.3.0] non-5-ene) from N-benzylated precursors in a representative PLB system. MA is the reaction between a nucleophile and an active double bond group. There are many variations to this chemistry but the reaction between a β-keto ester and an acrylate double bond catalyzed by a strong base is of particular interest as the crosslinked network formed is built on carbon-carbon bonds and therefore, the cured material has outstanding stability. A general reaction scheme for the MA reaction mechanism is shown in FIG. 6. By controlling organic and inorganic domains at molecular level, it is possible to effectively manipulate properties of OIH materials. The mechanical properties of the coatings formed using MA can be further enhanced by incorporating suitable inorganic domains into the network such that a hybrid interconnected network can be formed. Base catalyzed sol-gel chemistry provides a reaction scheme in which the photo-triggered base also catalyzes addition and condensation reactions of the silane groups. The choice of resins can be used to tailor the properties the cured coating exhibits based on the type and proportion of organic/inorganic components. This example illustrates the technical and environmental benefits of these OIH coatings with uses in advanced coatings and additive manufacturing.

The OIH coating systems in this example can undergo MA and sol-gel reactions upon UV exposure in the presence of a suitable PLB. A very high extent of reaction was observer, when MA and sol-gel components were used alone as well as in combination. Further coatings combined both MA and sol-gel chemistry, while completely eliminating conventional acrylate type reactive diluents (RDs). Furthermore, such compositions required only single UV-trigger for complete cross-linking. A series of coatings with increasing inorganic content were cured and tested for improvements in mechanical properties. The results so obtained highlight many technical benefits of these coating systems, which can be used in advanced coatings, adhesives, inks and additive manufacturing. The effectiveness of the OIH resins without RDs in reducing viscosity was compared with the reduction in viscosity observed with the conventional acrylate type RDs.

Materials: T-butyl acetoacetate (t-BAA) (CAS 1694-31-1) was obtained from Eastman Chemical Company and was used to synthesize acetoacetate based resins. Trimethylolpropane Triacrylate (TMPTA), 1,6-Hexanediol Diacrylate (HDDA), Dipropylene Glycol Diacrylate (DPGDA), and Pentaerythritol Triacrylate (PETIA) were obtained from Allnex Inc. EBECRYL 8402 (aliphatic urethane acrylate) and EBECRYL 854 (polyester acrylate) were obtained from Allnex Inc. and were used for viscosity measurements. 1,1,1-Tris (hydroxymethyl) propane (TMP) (CAS 77-99-6), 1,6-Hexane Diol (HD) (CAS 629-11-8), Pentaerythritol (PET) (CAS 115-77-5) and Dipropylene Glycol (DPG) (CAS Number—25265-71-8) were obtained from Sigma Aldrich and were used to synthesize acetoacetate based resins. GELEST 6487, obtained from Gelest, USA, is methacryloxypropyltriethoxysilane (CAS 21142-29-0) and was used as a source of silane functional groups. DESMODUR N3800 (obtained from Covestro) is an aliphatic polyisocyanate and was used in the synthesis of urethane acrylate. 2-Hydroxyethyl acrylate (CAS 818-61-1) was obtained from Sigma Aldrich and was used in the synthesis of urethane acrylate. Dibutyltin Dilaurate (DBTDL) (CAS 77-58-7) was the catalyst used for urethane acrylate synthesis and was obtained from Sigma Aldrich. CGI-90 is a PBG provided by BASF. 2-iso-propylthioxanthone (ITX) (CAS 5495-84-1) is photo-synergist used in conjunction with CGI-90. Acetone was obtained from Sigma Aldrich. Thin Cold-Rolled steel panels (3×6×0.020") were obtained from ACS. All commercial products were used as received without further purification.

Coating and Testing Methods: Uncured coating compositions were evaluated using infrared spectroscopy using a Bruker-Tensor 27 FTIR spectrometer using NaCl pellets. The cured coating compositions were characterized using a Bruker Hyperion ATR analyzer. All coating compositions were applied on thin cold-rolled steel panels using a draw-down applicator at a wet-film thickness of 1 mill (25 μm). All coated panels were passed through UV-curing equipment (Fusion UV with a H-bulb) at a belt speed of 0.06 m/s for a total of 3 passes. The acrylate peak consumption was evaluated by FTIR and ATR. The carbonyl stretching peaks at 1725 $cm^{-1}$ (uncured composition) and 1715 $cm^{-1}$ (cured composition) were used as reference peaks for normalization of acrylate and acetoacetate peak results. The acrylate consumption was tracked and calculated using the peak at 810 $cm^{-1}$ and the acetoacetate consumption was tracked and calculated using the peak at 1410 $cm^{-1}$. For validating the sol-gel silane conversion to siloxane, the broadening of peak for Si—O—C linkage to Si—O—Si linkage (between 1050 $cm^{-1}$ to 1110 $cm^{-1}$) was analyzed. Coating compositions involving MA chemistry alone were stored at room temperature (25 C) for 24 h. after curing and were then subjected to ATR analysis. Coating compositions involving sol-gel chemistry were stored at room temperature for 72 h. after curing and were then subjected to ATR analysis. The mechanical properties of the coatings formed were characterized using ASTM standards including Pendulum Hardness (ASTM-D-4366-16), Impact Resistance (ASTM D-2794-99), MEK Double Rub Test (ASTM D-4752-98) and Cross-Cut Adhesion Test (ASTM D3359-07). Viscosity was measured using a CAP 2000+ (Brookfield Engineering Lab., USA) viscometer at 25 C and at an RPM of 50 using Spindle No. 1. (ASTM D4287).

Synthesis of acetoacetate functional compounds: Four acetoacetate functional compounds were synthesized separately by condensation of multi-functional alcohols TMP (f=3), HD (f=2), DPG (f=2) and PET (f=4) and the acetoacetate functionality was introduced using t-BAA. Stoichiometric amounts of the multifunctional alcohols and t-BAA were added in separate 3-neck round bottom flasks and the reactions were carried at a temperature of 130 C for 3 h. under constant stirring. T-butanol was obtained as a by-product and no catalysts were required. The products obtained were then subjected to vacuum distillation to remove the leftover t-butanol and the percentage yield was calculated. The four acetoacetate-functional compounds were named as TMP-AA, HD-AA, DPG-AA and PET-AA for alcohols TMP, HD, DPG and PET respectively, and their compositions are summarized in Table 1 below.

TABLE 1

| Reactants and products for synthesizing acetoacetate based compounds | | | | |
|---|---|---|---|---|
| | Alcohol (g) | t-BAA (g) | Weight of Product (g) | Equivalent weight of product formed (g) |
| TMP - AA | TMP - 30.54 | 120.00 | 100.62 | 131.65 |
| HD - AA | HD - 36.62 | 108.96 | 102.71 | 144.70 |
| DPG-AA | DPG - 39.82 | 104.20 | 105.56 | 151.96 |
| PET-AA | PET - 25.07 | 129.52 | 100.98 | 122.19 |

Synthesis of urethane acrylate: In a 3-neck round bottom flask, 21.64 g (0.186 equivalents) of 2-HEA was placed along with 0.03 g of DBTDL. The flask was then connected to a mechanical stirrer, thermocouple and nitrogen purging inlet. In a dropping funnel, 78.36 g (0.205 equivalents) of Desmodur N3800 and 50 g of THF was added. The temperature of the flask was maintained between 60-70 C and the isocyanate solution was added gradually over a time of 2 h such that the temperature remained between 60-70 C. After all isocyanate was added, the reactive mixture was stirred at 60 C for half-an hour after which a sample from the reactive mixture was tested for % NCO content using ASTM D2572-97. The reactive mixture was then kept at 25 C overnight for the residual NCO groups to react with OH groups. A sample of the resin formed was procured again and tested for % NCO content. The equivalent weight of the resin (pure) formed was determined to be 498 g.

Resin systems: For each urethane and polyester acrylate, varying amounts of acetoacetate based and acrylate based RDs were added to 2 g of resin (EBECRYL 8402 and EBECRYL 854). The samples so prepared were then subjected to viscosity measurement using the cone and plate viscometer. The compositions are summarized in Table 2 below.

TABLE 2

Resin systems used for viscosity reduction analysis with EBECRYL 8402 urethane acrylate or EBECRYL 854 polyester acrylate (2 g)

|     | HDDA (g) | HD-AA (g) | DPGDA (g) | DPG-AA (g) | TMPTA (g) | TMP-AA (g) | PETIA (g) | PET-AA (g) |
|-----|------|------|------|------|------|------|------|------|
| 15% | 0.35 | 0.35 | 0.35 | 0.35 | 0.35 | 0.35 | 0.35 | 0.35 |
| 20% | 0.5  | 0.5  | 0.5  | 0.5  | 0.5  | 0.5  | 0.5  | 0.5  |
| 25% | 0.67 | 0.67 | 0.67 | 0.67 | 0.67 | 0.67 | 0.67 | 0.67 |
| 30% | 0.85 | 0.85 | 0.85 | 0.85 | 0.85 | 0.85 | 0.85 | 0.85 |
| 35% | 1.08 | 1.08 | 1.08 | 1.08 | 1.08 | 1.08 | 1.08 | 1.08 |
| 40% | 1.33 | 1.33 | 1.33 | 1.33 | 1.33 | 1.33 | 1.33 | 1.33 |

Plural-cure coating systems: Tables 3.1-3.3 summarize the compositions of various plural-cure coating compositions.

Table 3.1 contains three coating compositions. Sample C-1 was prepared to investigate the feasibility of MA between acetoacetate groups and acrylate groups in the presence of CGI-90 (after UV curing), and sample C-1 accordingly did not contain any silane functional groups. Sample C-2 was prepared to investigate the feasibility of sol-gel reaction in the presence of CGI-90 (after UV curing). Sample C-3 contains functional groups for both MA as well as sol-gel chemistry. This composition was prepared, cured and characterized to investigate whether MA and Sol-Gel can occur concomitantly but independently with each other in the presence of CGI-90 (after curing). Thus, sample C-3 cures by dual cure mechanism where the super base released by CGI-90 upon its UV induced photolysis initiates MA and catalyzes the hydrolysis and condensation of the silane groups to form siloxane linkages. For all compositions in Table 3.1, TMPTA was used a source for acrylate groups and TMP-AA was used as the source for acetoacetate groups. GELEST 6487 also contributes to the methacrylate group and the stoichiometry of all these compositions has been calculated keeping that into consideration. The percentage dose of CGI-90 for these compositions was selected to be 3% of the resin weight based on preliminary tests for different resin concentrations. ITX was added as a photo-sensitizer to enhance the efficiency of CGI-90. The ratio of CGI-90 to ITX was fixed at 4:1. Acetone was used in minimal amounts to dissolve CGI-90 and ITX and form a solution.

Table 3.2 contains four coating compositions. For all compositions in Table 3.2, urethane acrylate (UA) was used. After validation of MA and Sol-Gel chemistries using model reactants and CGI-90, a UA comparable in molecular weight to those used in commercial UV cure application was synthesized. UA chemistry was chosen in keeping with their high viscosities so that the effect of acetoacetate type reactive diluents could be adequately assessed. Formulations OIH-0, OIH-5, OIH-10 and OIH-15 were selection such that the silane content varies as 0%, 5%, 10% and 15% (by mass), respectively. Therefore, OIH-0 would only have MA chemistry and OIH-5, OIH-10 and OIH-15 would have both MA and Sol-Gel chemistries during or after UV-exposure. These OIH films were studied to measure the changes in film properties as a function of silane content.

Table 3.3 contains a coating composition that has only acrylate groups and was selected to assess the extent of acrylate conversion using CGI-90. The percentage of TMPTA in C-4 is the same as the percentage of TMP-AA in OIH-0. Since the conventional UV-curable coatings contain a low-molecular weight acrylate as a reactive diluent (e.g. TMPTA), it is important to compare cured films based on solely acrylate chemistry with those containing MA and sol-gel chemistries, in addition to acrylate chemistry. Sample C-4 also demonstrates how a photo-base generator can be used to cure an acrylate composition. CGI-90 releases a super base DBN upon UV irradiation which brings about curing of acrylate groups via anionic polymerization.

TABLE 3.1

Plural Cure Coating Compositions

|     | TMPTA (g) | TMP-AA (g) | Gelest 6487 (g) | CGI-90 (g) | ITX (g) | Acetone (g) |
|-----|------|------|------|------|------|------|
| C-1 | 3.89 | 5.45 | —    | 0.37 | 0.09 | 1.49 |
| C-2 | —    | —    | 4.14 | 0.16 | 0.04 | 0.66 |
| C-3 | 1.58 | 4.41 | 4.00 | 0.40 | 0.10 | 1.60 |

TABLE 3.2

Plural Cure Coating Compositions

|        | TMPTA (g) | TMP-AA (g) | Gelest 6487 (g) | CGI-90 (g) | ITX (g) | Acetone (g) |
|--------|------|------|------|------|-------|------|
| OIH-0  | 3.97 | 1.02 | —    | 0.15 | 0.037 | 0.60 |
| OIH-5  | 3.77 | 0.97 | 0.25 | 0.15 | 0.037 | 0.60 |
| OIH-10 | 3.57 | 0.92 | 0.50 | 0.15 | 0.037 | 0.60 |
| OIH-15 | 3.37 | 0.87 | 0.75 | 0.15 | 0.037 | 0.60 |

TABLE 3.3

Plural Cure Coating Compositions

|     | TMPTA (g) | TMP-AA (g) | Gelest 6487 (g) | CGI-90 (g) | ITX (g) | Acetone (g) |
|-----|------|------|---|------|-------|------|
| C-4 | 3.97 | 1.05 | — | 0.15 | 0.037 | 0.60 |

In a coatings containing acrylates and acetoacetate functional components, the super-base DBN released upon irradiation of UV will initiate or catalyze two competitive cure reactions. These are the MA reaction between acrylates and acetoacetate groups and anionic polymerization of acrylate groups. In order to evaluate the relative reaction rates, the cure characterization as studied by tracking both acrylate as well as the acetoacetate groups before and after UV-curing. While the depletion of acetoacetate groups directly relates to the extent of MA reaction, the acrylate group depletion relates to the extent of both MA as well as the acrylate polymerization of acrylates. By subtracting the extent of MA from the % conversion of acrylate groups, the extent of anionic polymerization of acrylate groups can be estimated.

The organosilane compound GELEST 6487 expands the functionality of the coating compositions. GELEST 6487 has two functional groups—(meth)acrylate group and the silane group. Therefore, after UV curing, the (meth)acrylate group would become a part of the organic network and the silane groups would self-condense via siloxane linkages forming inorganic domains within cured coating network. Thus, the organic-inorganic sub-networks would be interwoven by carbon-carbon covalent bonds, adding greater toughness and resilience to the otherwise organic-inorganic networks that are bonded together by relatively weaker forces of attraction such as dispersion forces, dipole-dipole interactions etc.

Cure evaluation: FT-IR spectra of coatings before and after UV exposure were acquired to determine type of cure reaction and using peak intensity ratio method, the extent of reactions was calculated. The IR spectra indicated that the acrylate groups and the acetoacetate groups were depleted, indicating that the MA reaction occurred. Acetoacetate depletion was around 77%, and the acrylate depletion was around 93.78%, which suggests that MA takes precedence over acrylate anionic polymerization when the functional groups for both reactions are present. The overall extent of reaction shows that both acetoacetate and acrylate group depletion is fairly high with little residual groups in the film. The IR spectra further indicated that CGI-90 is an effective PBG that can initiate and catalyze both MA and sol-gel reactions concomitantly but independently.

Increasing silane content increased hardness and solvent resistance (MEK-double rub test) of the films, suggesting that increasing inorganic content leads to the films with improved hardness and crosslinking density. The overall improvement in mechanical and solvent resistance properties can be attributed to the formation of organic-inorganic network. This OIH network can be viewed as nano-composite film wherein dense silica domains (inorganic) are covalently bonded and uniformly distributed into a relatively flexible polyurethane matrix (organic). Increase in hardness in samples OIH-0 through OIH-15 can be attributed to increase in hard silica domains, as a result of increasing silane content from 0% to 15%. Furthermore, increase in solvent-resistance of these samples, which is a measure of crosslink density, is clearly due to increase in silica domains (highly crosslinked network). Very poor solvent resistance for sample C-4 is due to absence of silica domains.

Viscosity evaluation: Viscosity profiles of compositions containing four different acetoacetate type RDs were compared relative to their conventional acrylate type RD counterparts to assess the effectiveness of acetoacetate type reactive diluents for their viscosity reduction efficiency. For the aliphatic urethane acrylate (EBECRYL 84027), the acetoacetate-based RDs (TMP-AA and PET-AA) perform better in reducing viscosity than their corresponding acrylate-based RDs, with the PET-AA being a far better RD than PETIA. For the polyester acrylate (EBECRYL 854), results similar to those obtained for EBECRYL 8402 were observed. The viscosity study demonstrated that acetoacetate type RDs were effective in viscosity reduction of oligomers and hence can replace corresponding acrylate type RDs in coating formulations.

Summary: Super Photo-base (CGI-90) can successfully be used to trigger Michael-addition, anionic polymerization of acrylates, and sol-gel reaction of organosilanes concomitantly upon irradiation of UV light. Coating compositions containing Michael donor/acceptor, acrylate compounds and organosilanes were cured using a single UV-trigger. It is possible to develop UV-curable coating with tunable properties by leveraging different cure reactions using a single UV trigger. Such coatings can be formulated without the use of conventional acrylate RDs or free-radical initiator, providing significant technical and environmental and health related benefits. The example also illustrates that acetoacetate type reactive diluents can effectively reduce viscosity when compared with the conventional RDs.

Example 2—Primary and Secondary Plural Cure Polymeric Compositions

This example illustrates plural-cure compositions according to the disclosure, which compositions involve MA curing reactions, but which do not necessarily form an OIH network, for example when there are no silane components or when the silane components form a second (e.g., interpenetrating) network in addition to the first (e.g., MA-based) network. The plural cure systems generally include a rapid cure system (e.g., set of reactive components) and a secondary cure system (e.g., additional set of reactive components). In a typical coating or additive manufacturing process, the (uncured) liquid phase plural cure composition is applied to a substrate, for example a metal or other substrate to be protected, a conventional additive manufacturing layer, or a previously applied (and at least partially cured) polymeric composition according to the disclosure. Application of UV radiation initiates a first (rapid) curing process that forms some polymerization/crosslinking bonds among the rapid cure components to rapidly develop the green strength of the corresponding solid layer. A second (slower or "dark cure" without UV radiation) curing process then follows, typically under ambient conditions, in which the secondary cure components form polymerization/crosslinking bonds over a longer timescale to improve interlayer crosslinking, interlayer adhesion, and improved mechanical properties, all generally without volatile organic compound (VOC) emission.

Figure 9:
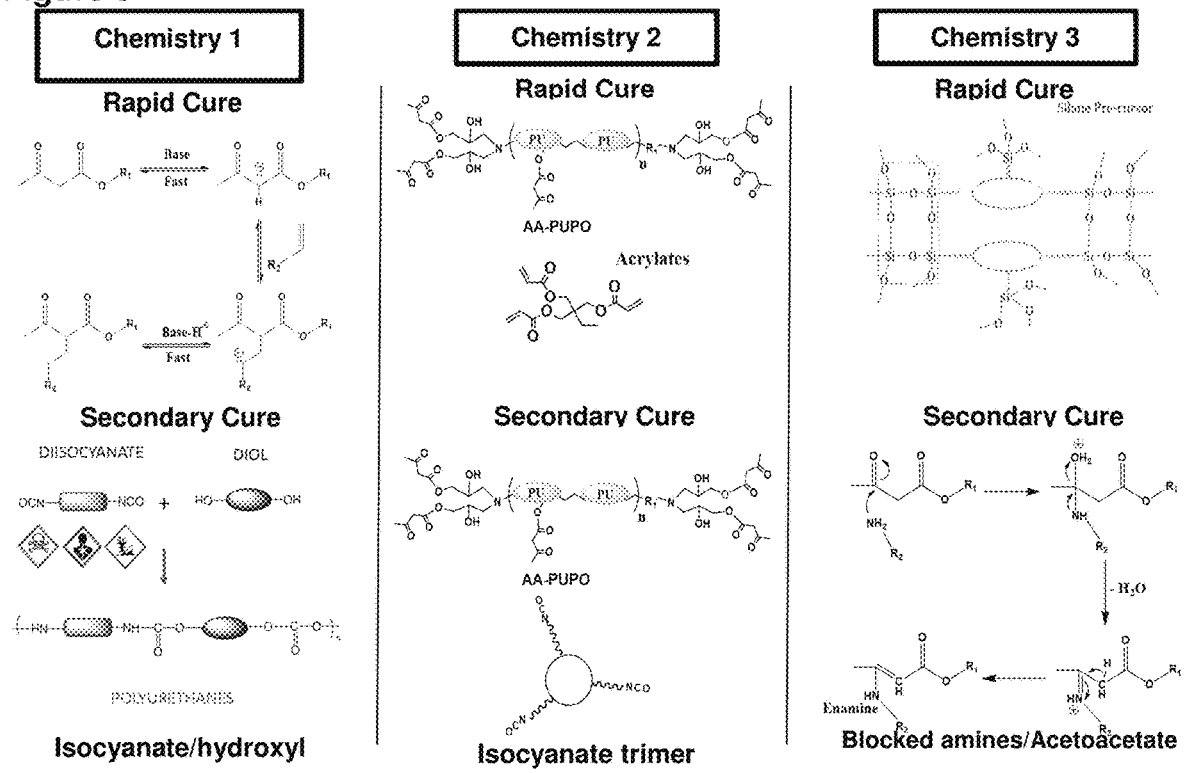
FIG. 9 depicts three separate combinations of polymeric compositions as disclosed herein. Chemistry 1 is shown as having a first rapid cure including an acetoacetate monomer polymerizing with a vinyl monomer, and a secondary cure including a diisocyanate polymerizing with a diol to form a polyurethane. Chemistry 2 is shown as having a first rapid cure including a precursor polymer including acetoacetate groups, hydroxyl groups, and polyurethane polymerizing with a triacrylate, and a secondary cure including a precursor polymer including acetoacetate groups, hydroxyl groups, and polyurethane polymerizing with a polyisocyanate. Chemistry 3 is shown as having a first rapid cure including a silane precursor polymer condensing, and a secondary cure including a acetoacetate polymerizing with a blocked amine.

In this example, the primary and secondary plural cure polymeric compositions (FIG. 9; Chemistries 1, 2, and 3) were prepared by mixing components such that the components for both the rapid cure system and secondary cure systems were approximately 50% by weight each. It is possible for the weight of the components to range from 80/20 to 20/80 by weight % (rapid/secondary, respectively). Chemistry 1 is shown as having a first rapid cure including MA reaction between an acetoacetate monomer polymerizing with a vinyl monomer, and a separate secondary cure including a diisocyanate polymerizing with a diol to form a polyurethane. Chemistry 2 is shown as having a first rapid cure including MA reaction between a precursor polymer including acetoacetate groups, hydroxyl groups, and polyurethane polymerizing with a triacrylate (i.e., acrylate/acetoacetate MA reaction), and a secondary cure including the same precursor polymer polymerizing with a polyisocyanate (i.e., isocyanate reaction with the hydroxyl groups on the precursor polymer), thus forming a combined network between the rapid and secondary cure components via the common precursor polymer having acetoacetate and hydroxyl groups for the two curing reactions. Chemistry 3 is shown as having a first rapid cure including a silane precursor polymer condensing (e.g., from a silane compound having at least two hydrolysable groups), and a separate secondary cure including a acetoacetate polymerizing with a blocked amine. The polymeric compositions according to all three chemistries were prepared according to two different formulations as follows:

Formulation-1: For all three chemistries shown in FIG. 9, Formulation-1 only included the components for the "rapid cure" mechanism. These compositions were intended to evaluate the properties of the coating cured by a single rapid cure mechanism.

Formulation-2: For all three chemistries shown in FIG. 9, Formulation-2 included the components for both rapid and secondary cure mechanisms. These components were intended to evaluate the properties of coatings cured by both rapid and secondary cure mechanisms.

The liquid polymeric compositions, chemistries 1, 2, and 3 according to formulations 1 and 2, independently, were applied onto a clean steel test panel (6"×4"), using a block applicator that produces an approximately 3 mil dry film thickness of the coating. After the application of a wet layer, samples were placed on a conveyer belt and exposed to a UV lamp (Mercury lamp H-bulb, Fusion UV system). For each exposure, UV energy density at the film surface was 2.94 J/cm$^2$. Within 30 seconds, another layer of coating was applied and exposed to UV-lamp. This process was repeated until 4-5 successive layers were applied such that the final dry film thickness for each sample was about 15 mil. All samples were tested after 24 hrs of their application.

Figure 10:
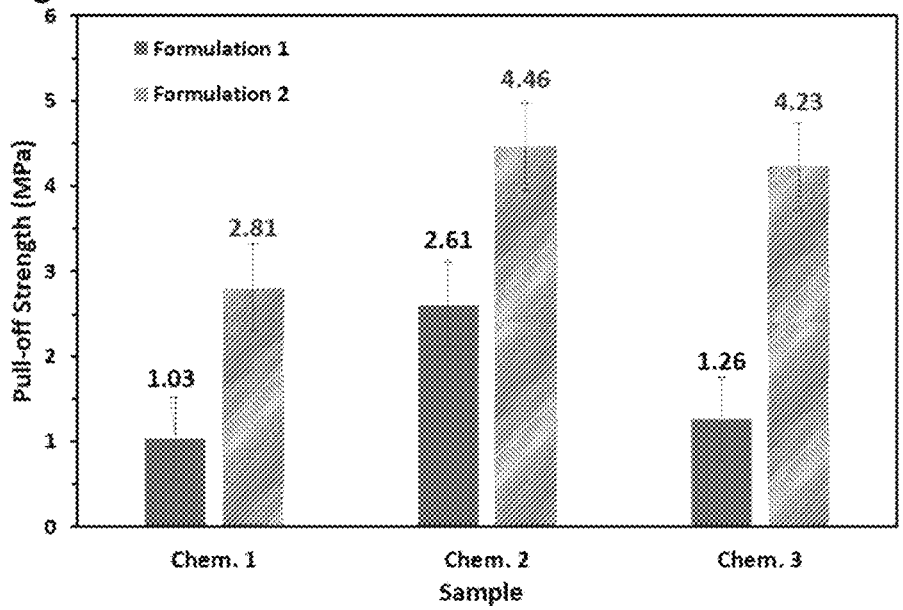
FIG. 10 is a graph of the pull-off strength in MPa of all three chemistries shown in FIG. 9 after the rapid cure (i.e., formulation 1) and after the secondary cure (i.e., formulation 2).
Figure 11:
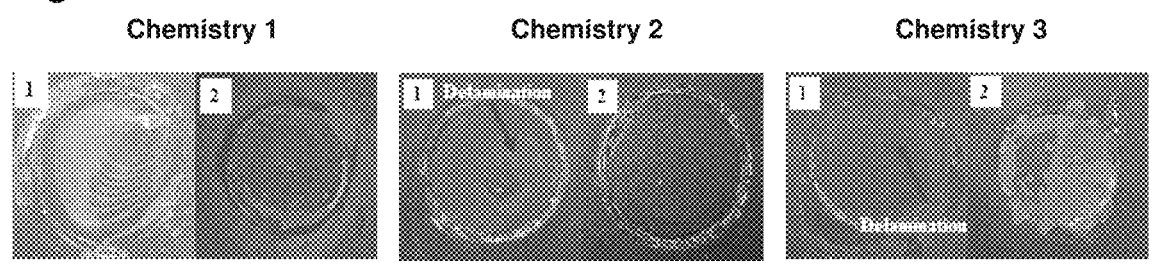
FIG. 11 is a series of photographic images showing the results of the pull-off strength in MPa of all three chemistries shown in FIG. 9 after the rapid cure (i.e., 1) and after the secondary cure (i.e., 2).

Testing:

Testing and evaluation of all samples shown in the Table 4 below, were carried out as per ASTM test methods listed below.

chemistries, showed that the rapid cure (UV-cure) is sufficient to bring about adequate curing of the layer instantly upon UV-exposure and provides "green strength," enabling the application of subsequent curing immediately. "Green strength" is an important requirement of the stereolithography (SLA) (layer-by-layer application) method of additive manufacturing (3D printing). The results of the formulation 1 (rapid cure and secondary cure components), for all 3 chemistries, showed that mechanical properties of all the systems significantly improve after both the primary and secondary cure mechanisms when tested after 24 hours of their application (FIGS. 10 and 11, Table 4). The secondary cure, which had slower reaction kinetics compared to the rapid-cure, required a longer time to cure but the product can be made at a higher throughput because the secondary cure reactions can continue after the product is printed and stored. Particularly noteworthy were the results of the pull-off adhesion test and the tensile test. All the samples of formulation 2 showed significant improvement in adhesion and tensile strength as compared to formulation 1, the rapid cured only counterparts. This was attributed to the secondary cure reaction which not only occurs in the x-y plane of the coating layer but also occurs between two subsequent layers (in the z-direction or otherwise normal/orthogonal to the applied layer surfaces) that produced inter-layer covalent crosslinking. This inter-layer covalent crosslinking significantly improved the interfacial strength and hence the mechanical properties. Furthermore, unlike a single cure type SLA system, the dual-cure system, with a differential cure rate, tended to reduce stresses in the film. This com-

TABLE 4

| Test Method | Chemistry 1 | | Chemistry 2 | | Chemistry 3 | |
|---|---|---|---|---|---|---|
| | Formulation 1 | Formulation 2 | Formulation 1 | Formulation 2 | Formulation 1 | Formulation 2 |
| Pencil Hardness | 8H | 6H | 4B | H | 3H | HB |
| Pendulum Hardness | 140 ± 10 | 105 ± 5 | 35 ± 5 | 80 ± 5 | 85 ± 5 | 70 ± 5 |
| MEK Double-Rub | >300 | >300 | 40 ± 5 | 110 ± 5 | >300 | 90 ± 5 |
| Flexibility (⅛ inches) | Fail | Pass | Pass | Pass | Pass | Pass |
| Impact Resistance (in · lb) | <20 | 80 | >160 | 120 | 60 | >160 |
| Elongation % | — | 64 | 56 | 114 | 42 | 105 |
| Tensile Strength (MPa) | — | 2.64 | 0.68 | 1.35 | 1.04 | 1.71 |

Pendulum Hardness Test: ASTM D4366
Pencil Hardness: ASTM D3363
MEK-double rub test: ASTM D5402
Impact resistance test: ASTM D2794
Flexibility mandrel bend test: ASTM D522
Pull-off adhesion: ASTM D4541 using 20 mm dollies, and an epoxy glue. Pull-off adhesion test and tensile strength test were also carried out after 24 hrs of application and curing. For the tensile test, coatings were applied on an easy-to-release surface and free films were separated. The results are shown in FIGS. 10 and 11, as well as Table 4.

Results: The results of this example show that the dual-cure compositions based on three different chemistries were successfully cured by the dual-cure mechanism. The results of formulation 1 (rapid cure components only), for all 3 bination of factors helped improve the adhesion between the layers—a significant advantage for the additive manufacturing process.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compounds, compositions, methods, and processes are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A method for forming a polymeric composition, the method comprising:
    (a) providing a UV-curable composition comprising:
        (i) a Michael-addition (MA) acceptor compound comprising at least one MA acceptor functional group,
        (ii) a Michael-addition (MA) donor compound comprising at least one MA donor functional group comprising an acetoacetate group,
        (iii) a photo-latent base initiator, and
        (iv) at least one secondary curing compound selected from the group consisting of a polyisocyanate comprising at least two isocyanate groups, a polyol comprising at least two hydroxyl groups, and a silane compound comprising at least two hydrolysable groups; and
    (b) exposing the UV-curable composition to UV radiation (i) to form a base catalyst from the photo-latent base initiator and (ii) to subsequently catalyze with the base catalyst (A) MA polymerization between MA acceptor functional groups and MA donor functional groups, (B) anionic polymerization between MA acceptor functional groups, and (C) optionally polymerization of the at least one secondary curing compound, thereby forming the polymeric composition.

2. The method of claim 1, wherein the MA acceptor compound comprises two or more MA acceptor functional groups.

3. The method of claim 1, wherein the MA acceptor functional groups are selected from the group consisting of acrylate groups, methacrylate groups, vinyl groups, and combinations thereof.

4. The method of claim 1, wherein the MA acceptor functional groups comprise blocked amine groups.

5. The method of claim 1, wherein the MA acceptor compound is a ketimine compound.

6. The method of claim 1, wherein the MA donor compound comprises two or more MA donor functional groups.

7. The method of claim 1, wherein the photo-latent base (PLB) initiator comprises a photo-latent base precursor and a blocking group.

8. The method of claim 1, wherein the base catalyst is selected from the group consisting of 1,5-Diazabicyclo[4.3.0]non-5-ene (DBN), 1,8-Diazabicyclo[5.4.0]undec-7-ene (DBU), and combinations thereof.

9. A method for forming a polymeric composition, the method comprising:
    (a) providing a UV-curable composition comprising:
        (i) a Michael-addition (MA) acceptor compound comprising at least one MA acceptor functional group comprising an acrylate group,
        (ii) a Michael-addition (MA) donor compound comprising at least one MA donor functional group comprising an acetoacetate group,
        (iii) a photo-latent base initiator, and
        (iv) at least two secondary curing compounds comprising a polyisocyanate comprising at least two isocyanate groups, and a polyol comprising at least two hydroxyl groups; and
    (b) exposing the UV-curable composition to UV radiation (i) to form a base catalyst from the photo-latent base initiator and (ii) to subsequently catalyze with the base catalyst (A) MA polymerization between MA acceptor functional groups and MA donor functional groups, (B) anionic polymerization between MA acceptor functional groups, and (C) optionally polymerization of the at least two secondary curing compounds, thereby forming the polymeric composition.

10. The method of claim 1, wherein:
at least two of: the MA donor functional group, the at least two isocyanates, or the at least two hydroxyl groups are functional groups of a precursor polymer prior to exposing the UV-curable composition to UV radiation; and
the at least one secondary curing compound is reactive with the precursor polymer and is a polyisocyanate comprising at least two isocyanate groups or a polyol comprising at least two hydroxyl groups.

11. The method of claim 1, wherein:
at least two of: the MA acceptor functional group, the at least two isocyanates, or the at least two hydroxyl groups are functional groups of a precursor polymer prior to exposing the UV-curable composition to UV radiation; and
the at least one secondary curing compound is reactive with the precursor polymer and is a polyisocyanate comprising at least two isocyanate groups or a polyol comprising at least two hydroxyl groups.

12. A method for forming a polymeric composition, the method comprising:
    (a) providing a UV-curable composition comprising:
        (i) a Michael-addition (MA) acceptor compound comprising at least one MA acceptor functional group comprising a blocked amine group,
        (ii) a Michael-addition (MA) donor compound comprising at least one MA donor functional group comprising an acetoacetate group,
        (iii) a photo-latent base initiator, and
        (iv) at least one secondary curing compound comprising a silane compound comprising at least two hydrolysable groups; and
    (b) exposing the UV-curable composition to UV radiation (i) to form a base catalyst from the photo-latent base initiator and (ii) to subsequently catalyze with the base catalyst (A) MA polymerization between MA acceptor functional groups and MA donor functional groups, (B) anionic polymerization between MA acceptor functional groups, and (C) optionally polymerization of the at least one secondary curing compound, thereby forming the polymeric composition.

13. The method of claim 1, wherein:
providing the UV-curable composition in part (a) comprises applying the UV-curable composition to a substrate prior to exposing the UV-curable composition to UV radiation; and exposing the UV-curable composition to UV radiation forms a coating of the polymeric composition on the substrate.

14. The method of claim 13, wherein the substrate comprises a material selected from the group consisting of metals, alloys thereof, thermoplastic materials, thermoset materials, composite materials, primer materials, glass, wood, fabric, and ceramic materials.

15. The method of claim 13, wherein the coating has a thickness in the range of 1 µm to 100 µm.

16. The method of claim 1, wherein the UV-curable composition further comprises a solvent.

17. The method of claim 1, wherein the UV-curable composition further comprises one or more additives.

18. The method of claim 1, wherein:
the MA acceptor compound is present in the UV-curable composition in an amount in a range from 5 to 90 wt. % based on the UV-curable composition;
the MA donor compound is present in the UV-curable composition in an amount in a range from 5 to 90 wt. % based on the UV-curable composition;
the photo-latent base initiator is present in the UV-curable composition in an amount in a range from 0.5 to 20 wt. % based on the UV-curable composition; and
the at least one secondary curing compound is present in the UV-curable composition in an amount in a range from 5 to 90 wt. % based on the UV-curable composition.

19. The method of claim 1, wherein the MA acceptor compound comprises an $\alpha$, $\beta$ unsaturated compound or a ketone.

20. The method of claim 1, wherein:
the UV-composition comprises at least two of the secondary curing compounds;
at least one of the secondary curing compounds is the polyisocyanate comprising at least two isocyanate groups; and
at least one of the secondary curing compounds is the polyol comprising at least two hydroxyl groups.

21. The method of claim 20, wherein the polyisocyanate and the polyol react to form a polyurethane independently from and without covalent reaction with the MA acceptor compound or the MA donor compound.

22. The method of claim 20, wherein:
at least one of the polyisocyanate and the polyol comprises an MA acceptor group or an MA donor group that reacts with the MA donor compound or the MA acceptor compound, respectively; and
the polyisocyanate and the polyol react to form a polyurethane that further reacts with and is incorporated into a network with the MA donor compound and the MA acceptor compound.

* * * * *